United States Patent
Fujii et al.

(10) Patent No.: US 12,214,450 B2
(45) Date of Patent: Feb. 4, 2025

(54) WELDING STATE DETERMINATION SYSTEM AND WELDING STATE DETERMINATION METHOD

(71) Applicant: KOBE STEEL, LTD., Hyogo (JP)

(72) Inventors: Tatsuya Fujii, Hyogo (JP); Tsutomu One, Hyogo (JP); Atsushi Fukunaga, Kanagawa (JP)

(73) Assignee: KOBE STEEL, LTD., Hyogo (JP)

( * ) Notice: Subject to any disclaimer, the term of this patent is extended or adjusted under 35 U.S.C. 154(b) by 1420 days.

(21) Appl. No.: 16/480,644

(22) PCT Filed: Feb. 27, 2018

(86) PCT No.: PCT/JP2018/007369
§ 371 (c)(1),
(2) Date: Jul. 24, 2019

(87) PCT Pub. No.: WO2018/168448
PCT Pub. Date: Sep. 20, 2018

(65) Prior Publication Data
US 2020/0009673 A1   Jan. 9, 2020

(30) Foreign Application Priority Data
Mar. 13, 2017  (JP) .................. 2017-047262

(51) Int. Cl.
*B23K 9/095*     (2006.01)
*B23K 31/00*     (2006.01)
*G05B 19/4063*   (2006.01)

(52) U.S. Cl.
CPC .......... *B23K 9/0953* (2013.01); *B23K 9/0956* (2013.01); *B23K 31/003* (2013.01);
(Continued)

(58) Field of Classification Search
CPC .... B23K 9/0953; B23K 9/0956; B23K 9/095; B23K 9/09; B23K 31/003
(Continued)

(56) References Cited

U.S. PATENT DOCUMENTS

2003/0111450 A1   6/2003  Hong
2003/0234240 A1*  12/2003 Yamazaki ............ B23K 26/702
                                                    219/121.62
(Continued)

FOREIGN PATENT DOCUMENTS

CN   102615390 A    8/2012
JP   H05-057438 A   3/1993
(Continued)

OTHER PUBLICATIONS

Machine translation of JP 2015-013313 performed on Mar. 24, 2022.*
(Continued)

*Primary Examiner* — Steven W Crabb
*Assistant Examiner* — Alba T Rosario-Aponte
(74) *Attorney, Agent, or Firm* — Studebaker & Brackett PC

(57) ABSTRACT

This welding state determination system acquires, for each weaving cycle, a characteristic amount that pertains to a physical quantity that changes according to the cycle of a weaving operation. A degree of abnormality is calculated based on an observation value that is the characteristic amount acquired in one cycle, and the average and standard deviation of a plurality of past values that are the characteristic amounts acquired prior to the one cycle. A welding state is determined based on the calculated degree of abnormality.

15 Claims, 29 Drawing Sheets

(52) U.S. Cl.
CPC .................... *G05B 19/4063* (2013.01); *G05B 2219/34465* (2013.01); *G05B 2219/45104* (2013.01)

(58) Field of Classification Search
USPC ....... 219/137 PS, 137 R, 136, 130.51, 130.1, 219/130.33, 130.5, 130.01
See application file for complete search history.

(56) References Cited

U.S. PATENT DOCUMENTS

| | | | |
|---|---|---|---|
| 2011/0198331 A1* | 8/2011 | Shigeyoshi | B23K 9/173 219/130.32 |
| 2018/0178313 A1 | 6/2018 | Nakayama et al. | |

FOREIGN PATENT DOCUMENTS

| | | | |
|---|---|---|---|
| JP | 05115980 A | * | 5/1993 |
| JP | 2003-200264 A | | 7/2003 |
| JP | 3906561 B2 | | 4/2007 |
| JP | 2007-255925 A | | 10/2007 |
| JP | 2011064549 A | * | 3/2011 |
| JP | 2015013313 A | * | 1/2015 |
| WO | 2015/190165 A1 | | 12/2015 |

OTHER PUBLICATIONS

The extended European search report issued by the European Patent Office on Feb. 23, 2021, which corresponds to European Patent Application No. 18767914.7-1016 and is related to U.S. Appl. No. 16/480,644.

* cited by examiner

WELDING STATE DETERMINATION SYSTEM AND WELDING STATE DETERMINATION METHOD

TECHNICAL FIELD

The present disclosure relates to a welding state determination system and a welding state determination method for determining a welding state in arc welding.

BACKGROUND ART

A method of determining a welding state in arc welding is disclosed in Patent Document 1. The method disclosed in Patent Document 1 uses detection values of a welding voltage, a welding current, a welding speed, a wire feeding speed, a torch height, and an inert gas flow rate as weld signals, and sets a first level threshold stage for each of weld signals to maintain a welding layer in good quality when one of the weld signals is singly changed, and sets ranges of detection values for all combinations of the weld signals to maintain the welding layer in good quality when the two weld signals are changed simultaneously. When determining the quality of the welding layer, the method selects one or a plurality of weld signals, and compares the selected weld signal(s) with the first stage threshold value or the range of detection values and determines whether a defect is occurred in the welding layer based on the comparison result.

CITATION LIST

Patent Document

Patent Document 1: Japanese Patent No. 3906561

SUMMARY OF THE INVENTION

Problems that the Invention is to Solve

However, the method disclosed in Patent Document 1 requires that the first level threshold value and the range of detection values be changed accordingly when the welding condition such as an object to be welded, gas, and set current are changed. In particular, the ranges of detection values have to be entirely changed as many as the number of combinations of the weld signals.

The present disclosure has been made in view of such circumstances, and a main object is to provide a welding state determination system and a welding state determination method capable of determining a welding state with high accuracy without changing a setting value even when the welding state is changed.

Means for Solving the Problems

In order to solve the problems described above, a welding state determination system according to one aspect of the present disclosure determines a welding state in arc welding by a weaving operation of cyclically oscillating a welding torch, in which the welding state determination system includes an acquisition unit configured to acquire, for each cycle, a characteristic amount that pertains to a physical quantity that changes according to the cycle of the weaving operation, a calculation unit configured to calculate a degree of abnormality based on an observation value that is the characteristic amount acquired in one cycle by the acquisition unit and an average and standard deviation of a plurality of past values that are the characteristic amounts acquired prior to the one cycle by the acquisition unit, and a determination unit configured to determine the welding state based on the degree of abnormality calculated by the calculation unit.

In this aspect, the calculation unit may be configured to calculate the degree of abnormality for each cycle, and the welding state determination system may further include an exclusion unit configured to exclude the characteristic amounts used as the observation value in the calculation of the degree of abnormality in the previous cycles from the plurality of past values when the degree of abnormality calculated in cycles prior to the one cycle is greater than a predetermined reference value.

In the above aspect, the welding state determination system may further include an approximation unit configured to approximate a temporal change of the characteristic amount, and the calculation unit may be configured to calculate the degree of abnormality based on a difference between the observation value and approximation value of the observation value obtained by the approximation unit, and the average and standard deviation of the differences between the past values and the approximation values of the past values obtained by the approximation unit.

In the above aspect, the approximation unit may be configured to approximate the temporal change of the characteristic amount by linear approximation.

In the above aspect, the approximation unit may be configured to approximate the temporal change of the characteristic amount by quadratic approximation or exponential approximation.

In the above aspect, the characteristic amount may be an average value of the physical quantity in the cycle, a physical quantity at an oscillation end of the welding torch in the weaving operation, a physical quantity at the center of oscillation of the welding torch in the weaving operation, an integral value of the physical quantity in a section including the oscillation end, or an amplitude of a waveform approximate to the cyclical temporal change of the physical quantity.

In the above embodiment, the acquisition unit may be configured to acquire, as the characteristic amount, at least two or more of an average value of the physical quantity in the cycle, a physical quantity at the oscillation end of the welding torch in the weaving operation, a physical quantity at the center of oscillation of the welding torch in the weaving operation, an integral value of the physical quantity in a section including the oscillation end, or an amplitude of a waveform approximate the cyclical temporal change of the physical quantity, and the calculation unit may be configured to calculate the degree of abnormality separately for each of the characteristic amounts, and the determination unit may be configured to determine the welding state based on each of the degrees of abnormality calculated by the calculation unit.

In the above aspect, the welding state determination system may further include a controller configured to control the operation of arc welding based on the determination result of the welding state by the determination unit.

In the above aspect, the welding state determination system may further include an abnormality notification unit configured to notify the abnormality when the determination unit determines that the welding state is abnormal.

In the above aspect, the physical quantity may be a welding current or a welding voltage.

According to another aspect of the present disclosure, a welding state determination method for determining a welding state in arc welding by a weaving operation of cyclically oscillating a welding torch is provided, which includes acquiring, for each cycle, a characteristic amount that pertains to a physical quantity that changes according to the cycle of the weaving operation, calculating a degree of abnormality based on an observation value that is the characteristic amount acquired in one cycle and an average and a standard deviation of a plurality of past values that are the characteristic amounts acquired prior to the one cycle, and determining the welding state based on the calculated degree of abnormality.

Advantages of the Invention

According to a welding state determination system and a welding state determination method according to the present disclosure, even when the welding state is changed, the welding state can be determined with high accuracy without changing setting value.

10B is a graph illustrating a degree of abnormality calculated in Evaluation Test 2.

Figure 11A:
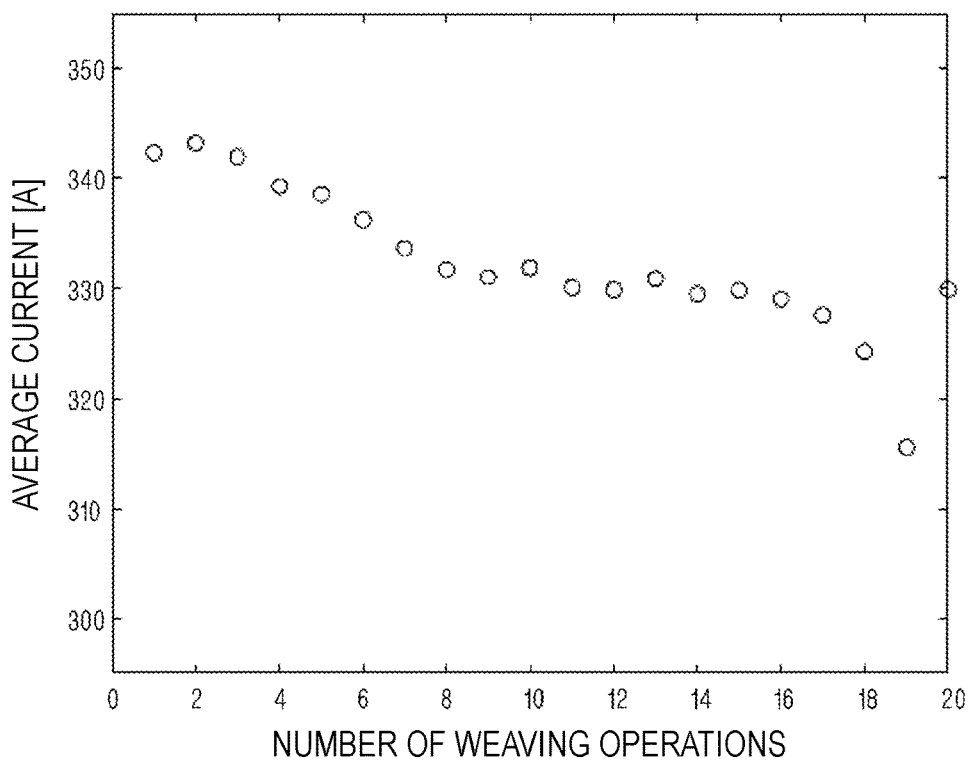

FIG. 11A is a graph illustrating an average current measured in Evaluation Test 3.

Figure 11B:
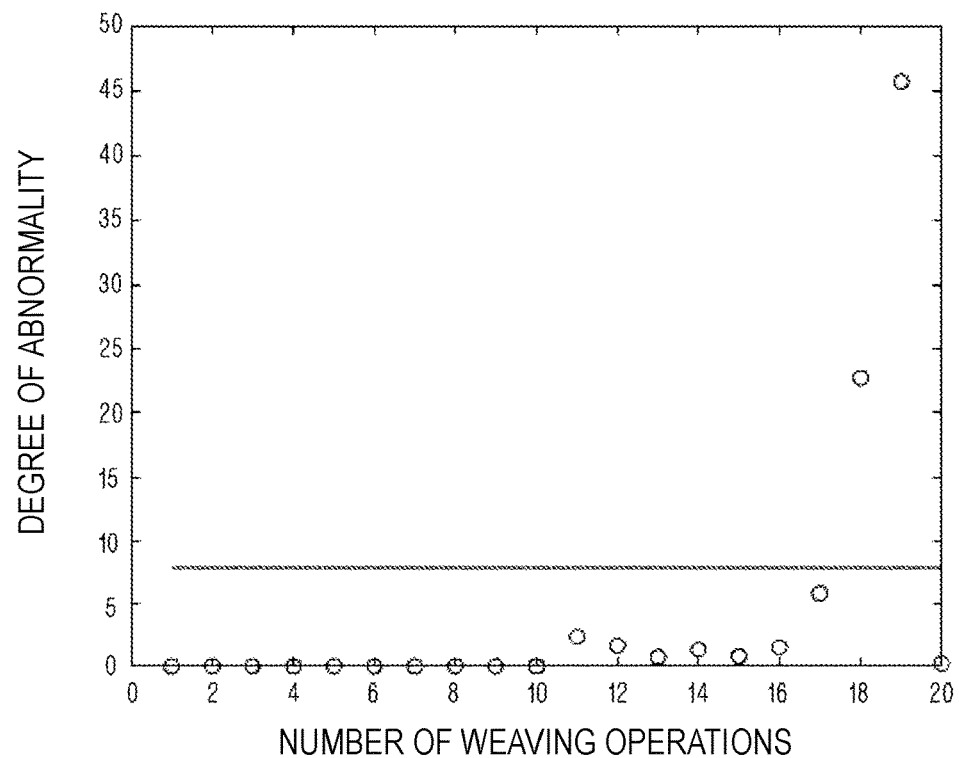

FIG. 11B is a graph illustrating a degree of abnormality calculated in Evaluation Test 3.

Figure 12:
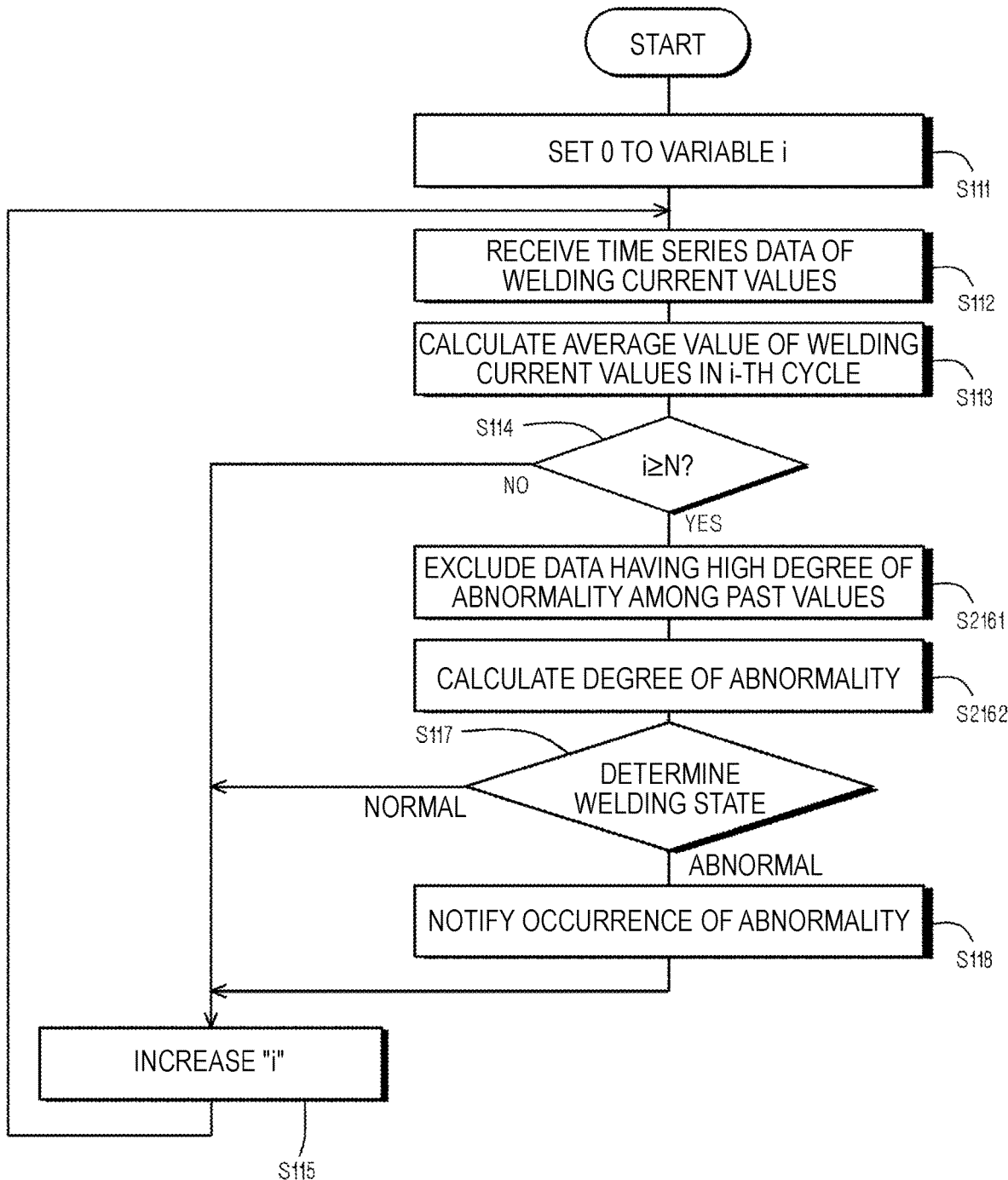

FIG. 12 is a flowchart illustrating an operation procedure of a welding state determination system according to Embodiment 2.

Figure 13:
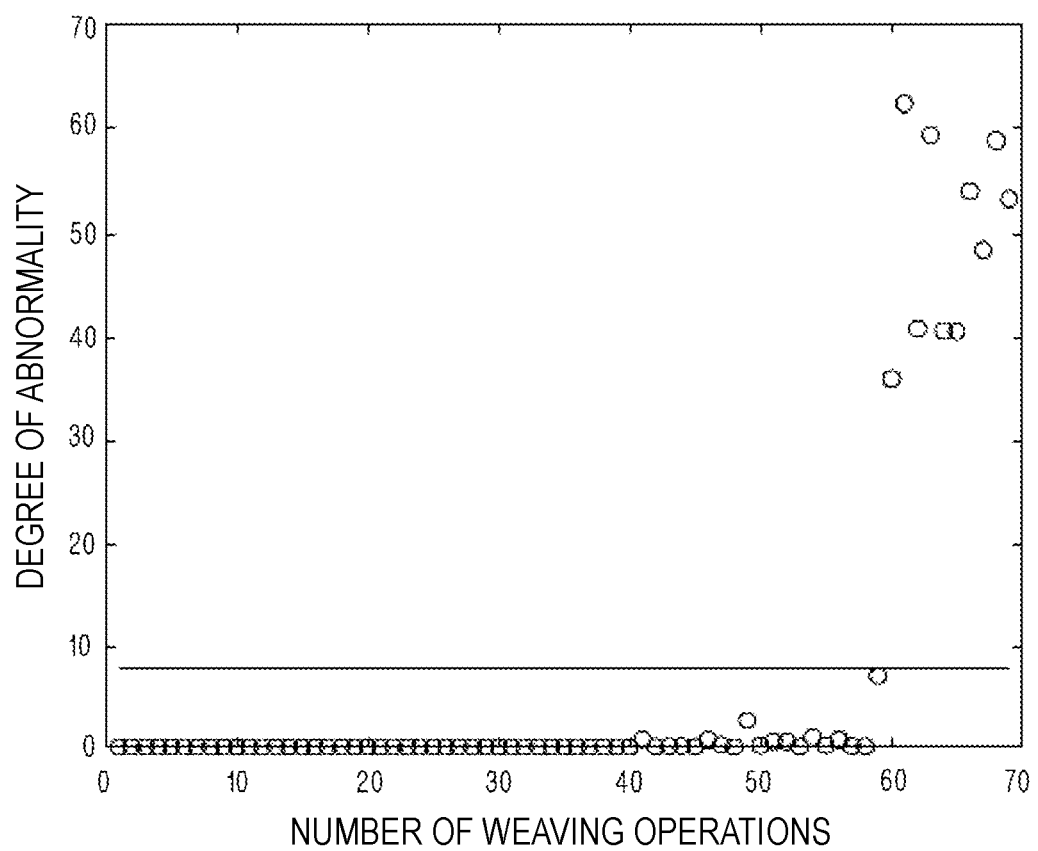

FIG. 13 is a graph illustrating a degree of abnormality calculated in Evaluation Test 4.

Figure 14:
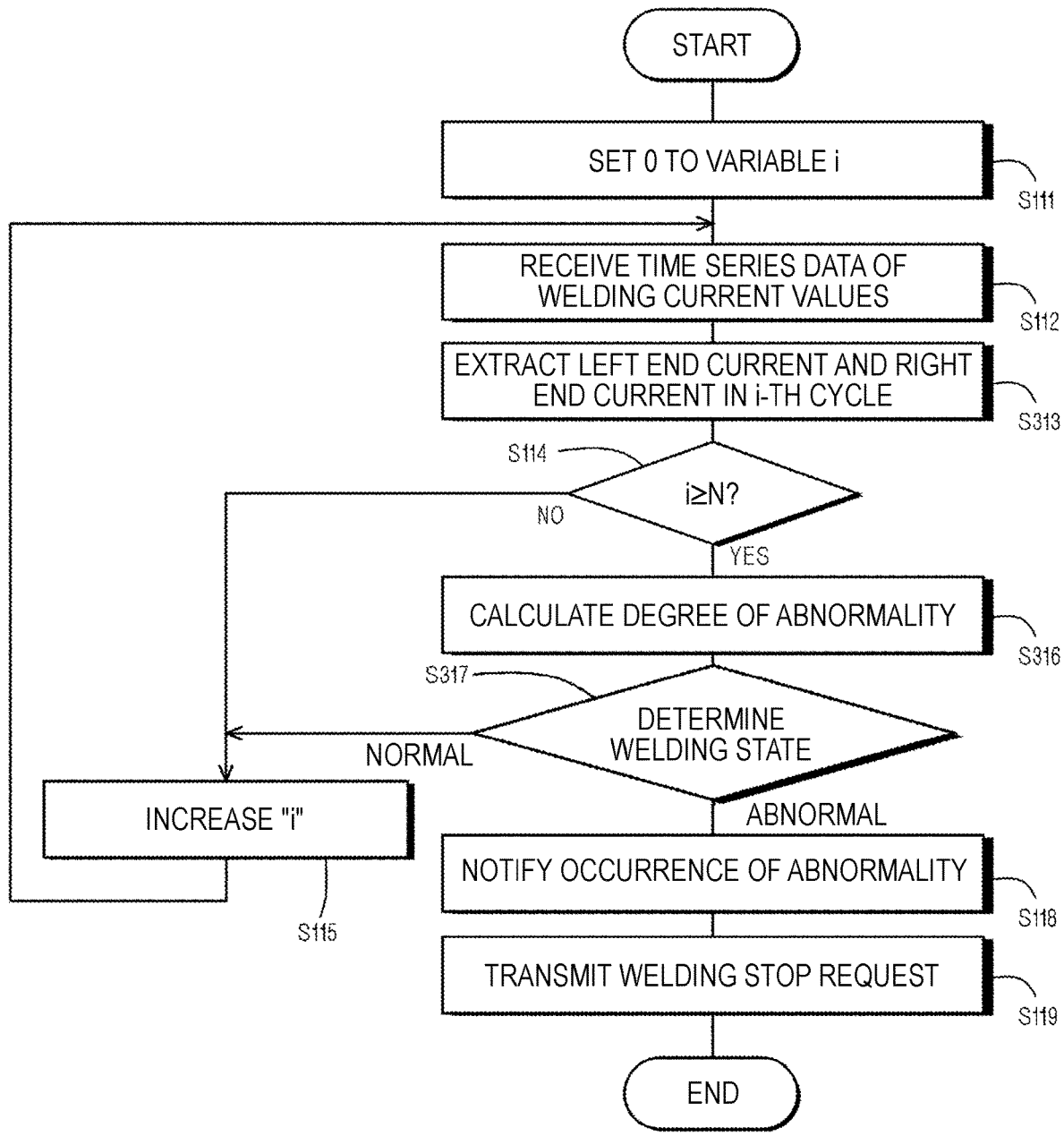

FIG. 14 is a flowchart illustrating an operation procedure of a welding state determination system according to Embodiment 3.

Figure 15A:
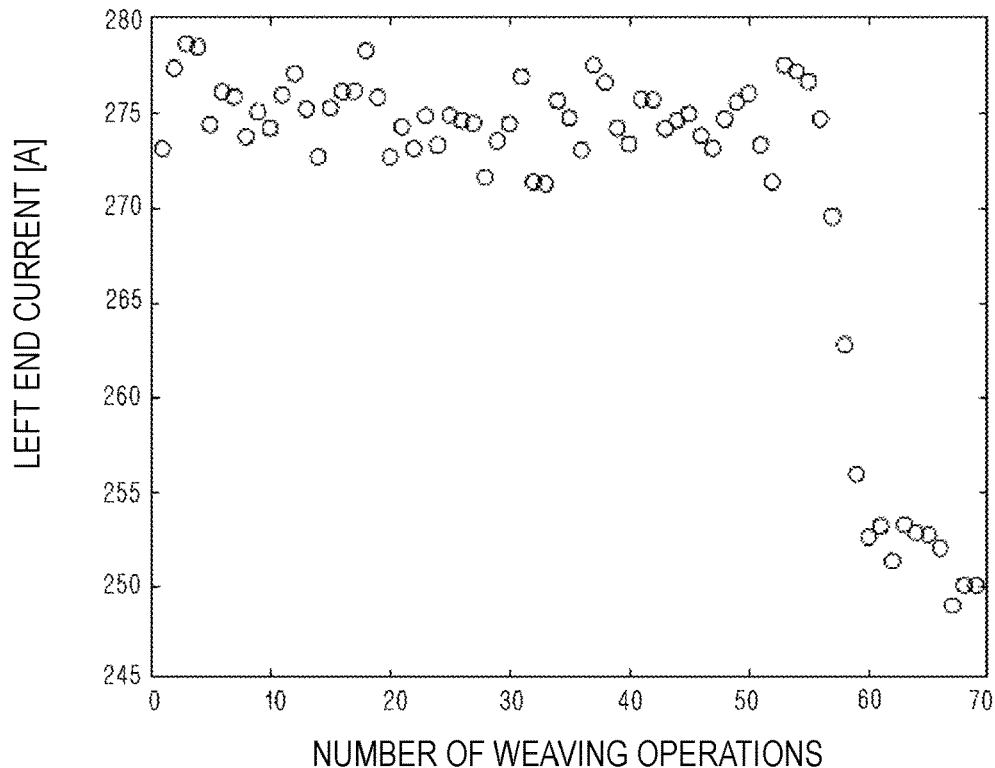

FIG. 15A is a graph illustrating a left end current measured in Evaluation Test 5.

Figure 15B:
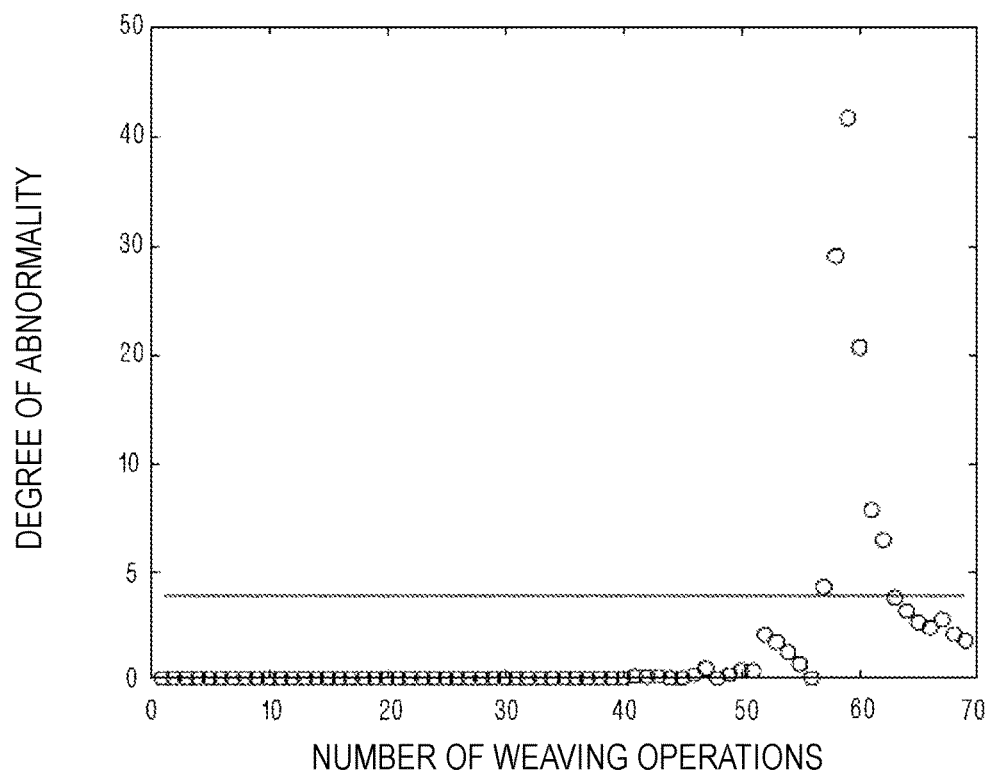

FIG. 15B is a graph illustrating a degree of abnormality with respect to the left end current calculated in Evaluation Test 5.

Figure 16A:
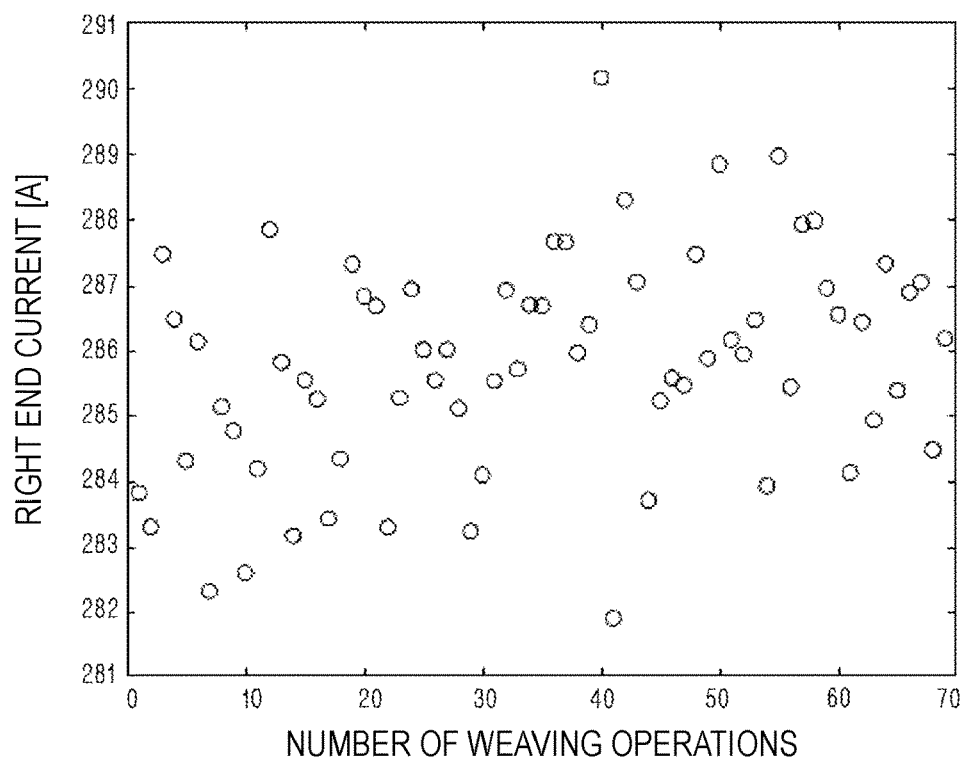

FIG. 16A is a graph illustrating a right end current measured in Evaluation Test 5.

Figure 16B:
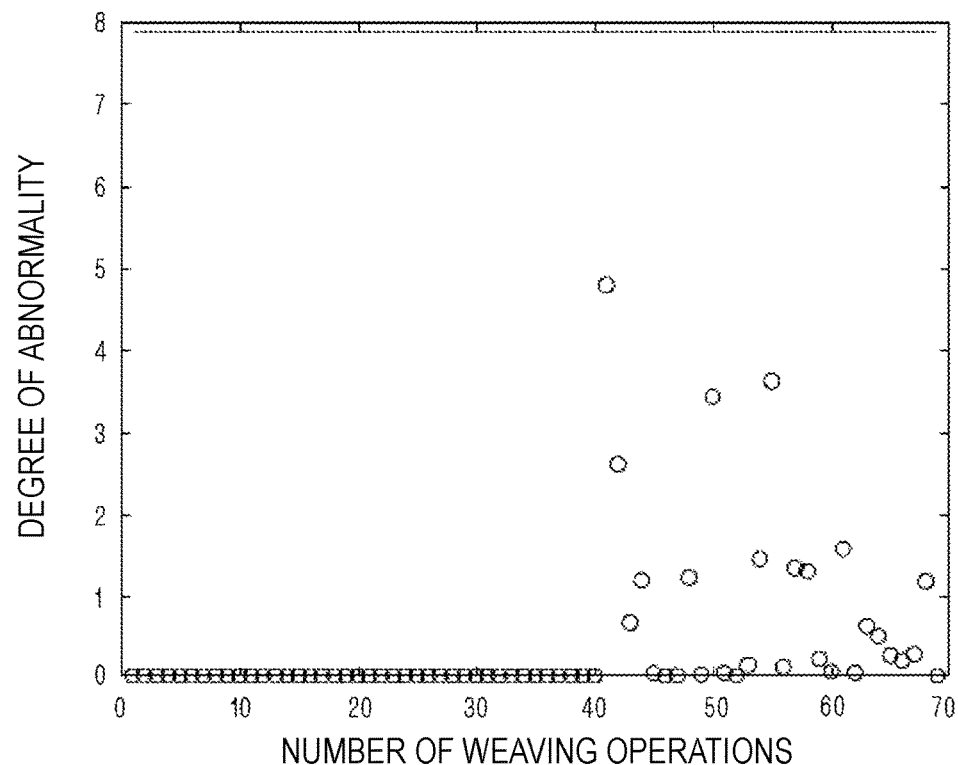

FIG. 16B is a graph illustrating a degree of abnormality with respect to the right end current calculated in Evaluation Test 5.

Figure 17:
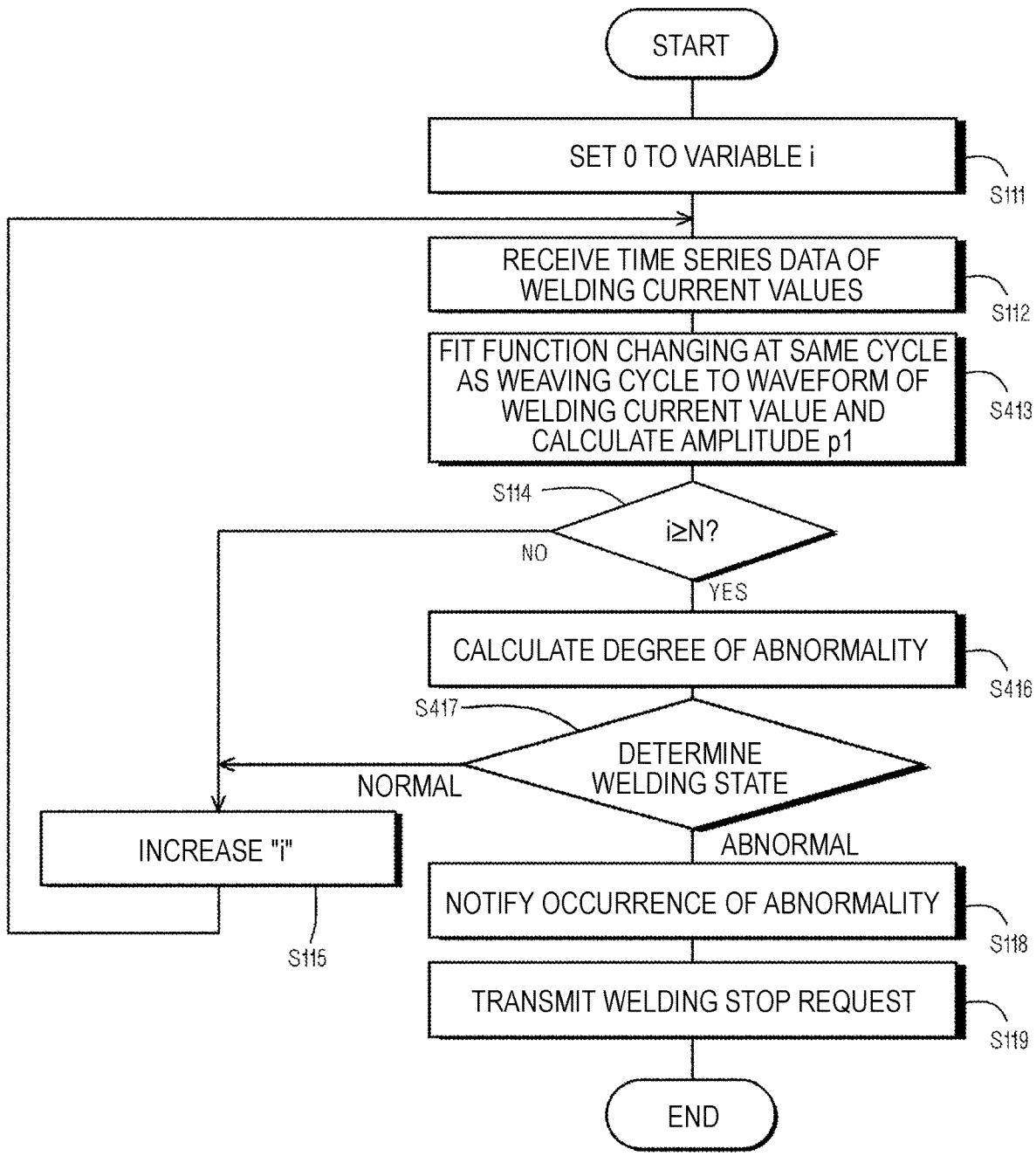

FIG. 17 is a flowchart illustrating an operation procedure of a welding state determination system according to Embodiment 4.

Figure 18A:
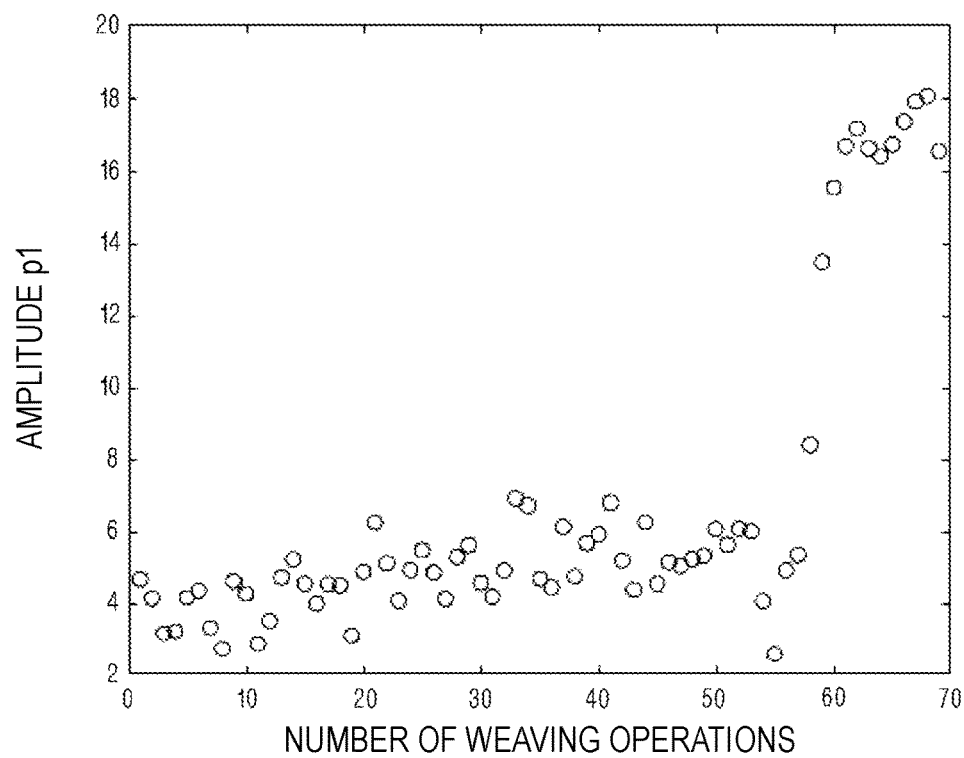

FIG. 18A is a graph illustrating an amplitude calculated in Evaluation Test 6.

Figure 18B:
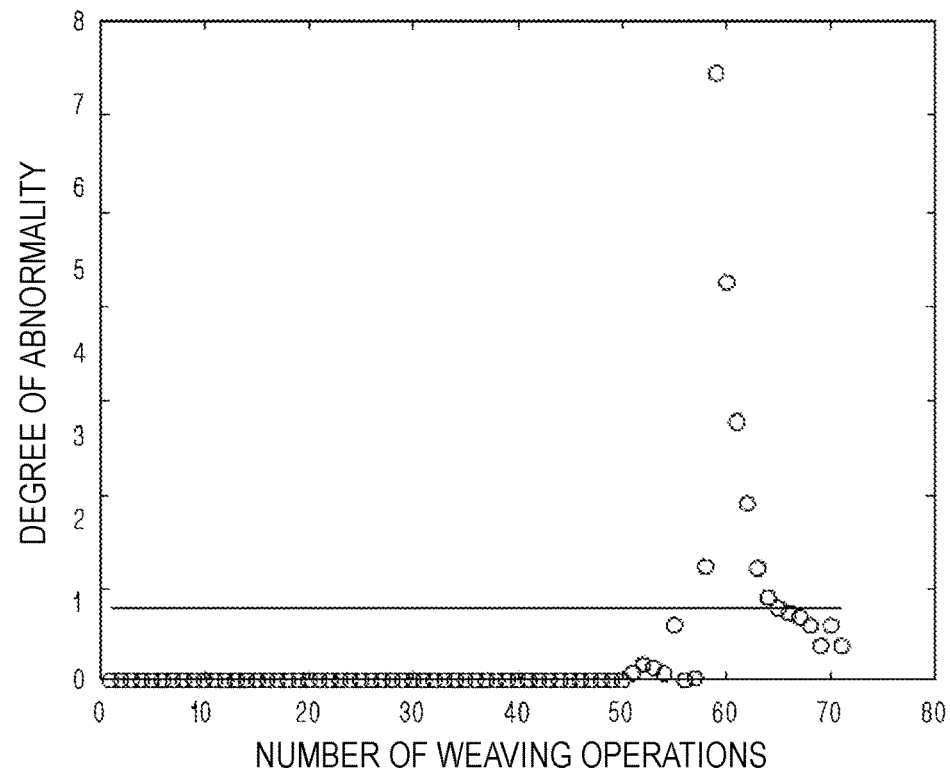

FIG. 18B is a graph illustrating a degree of abnormality with respect to the amplitude calculated in Evaluation Test 6.

Figure 19A:
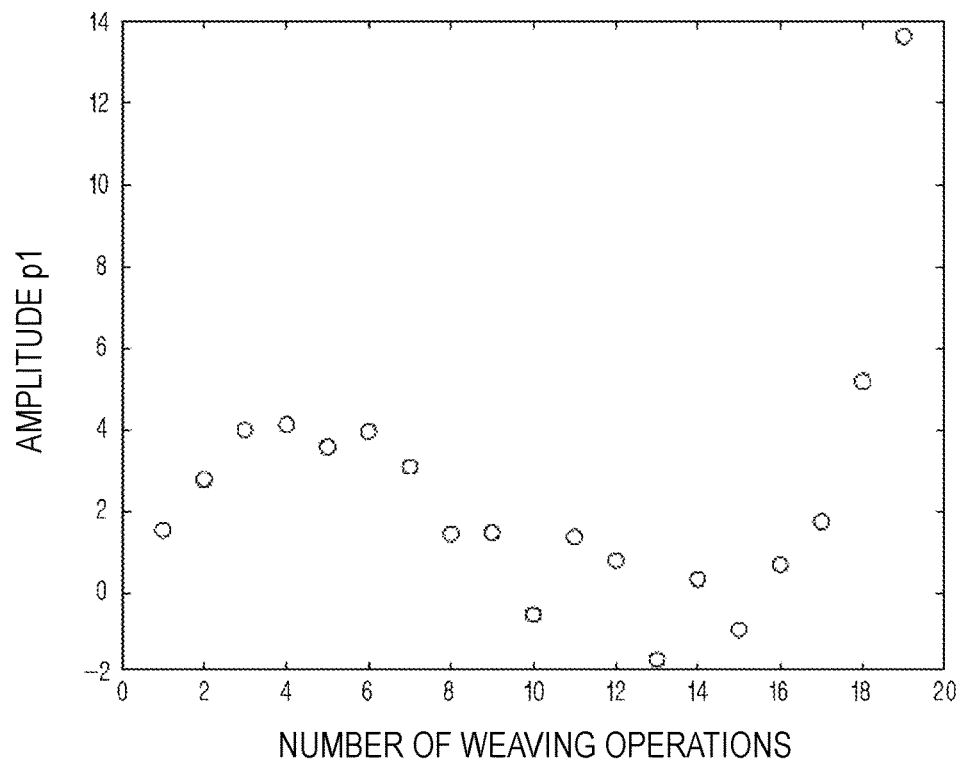

FIG. 19A is a graph illustrating an amplitude calculated in Evaluation Test 7.

Figure 19B:
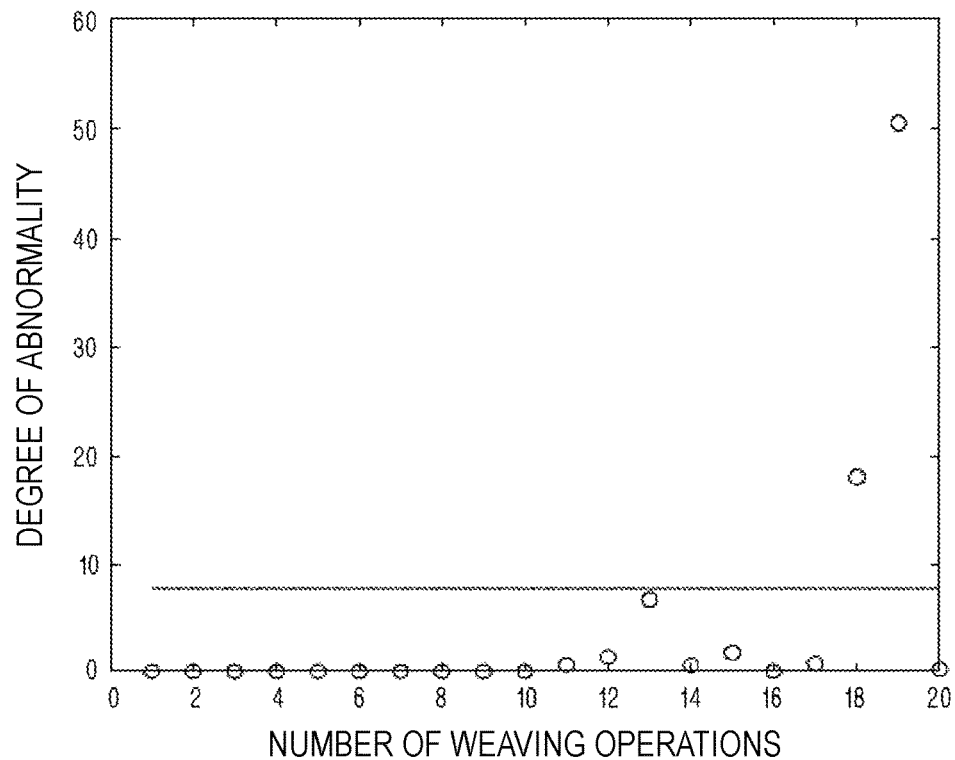

FIG. 19B is a graph illustrating a degree of abnormality with respect to the amplitude calculated in Evaluation Test 7.

Figure 20:
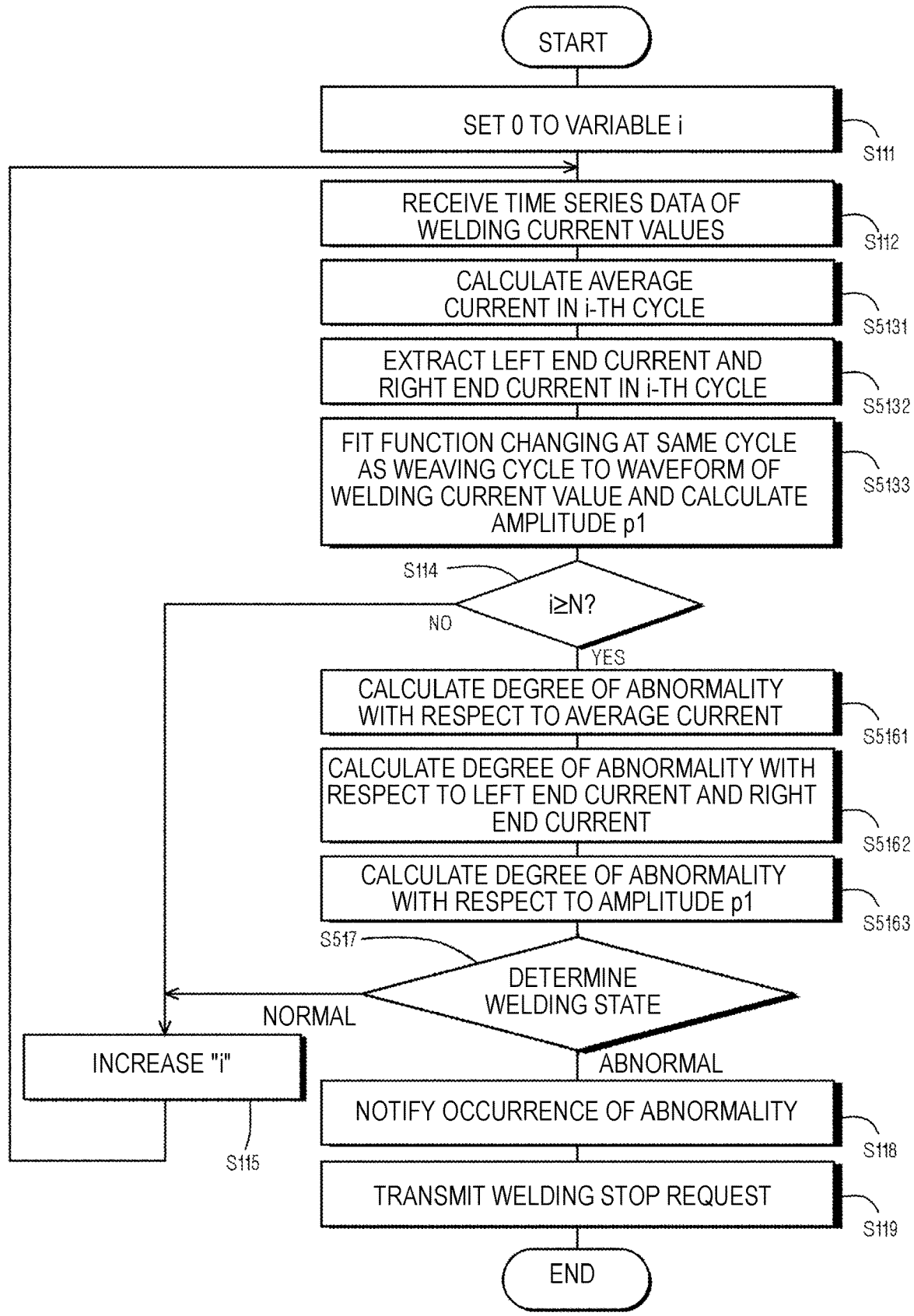

FIG. 20 is a flowchart illustrating an operation procedure of a welding state determination system according to Embodiment 5.

Figure 21:
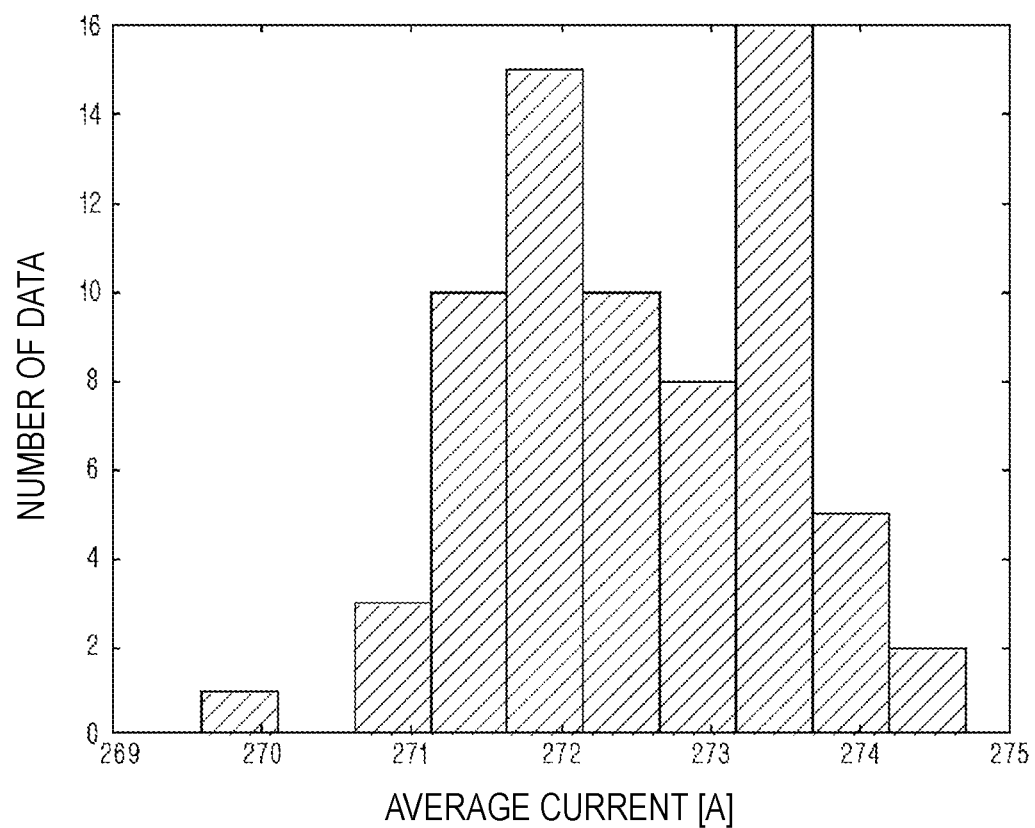

FIG. 21 is a histogram of the average current in Evaluation Test 2.

Figure 22:
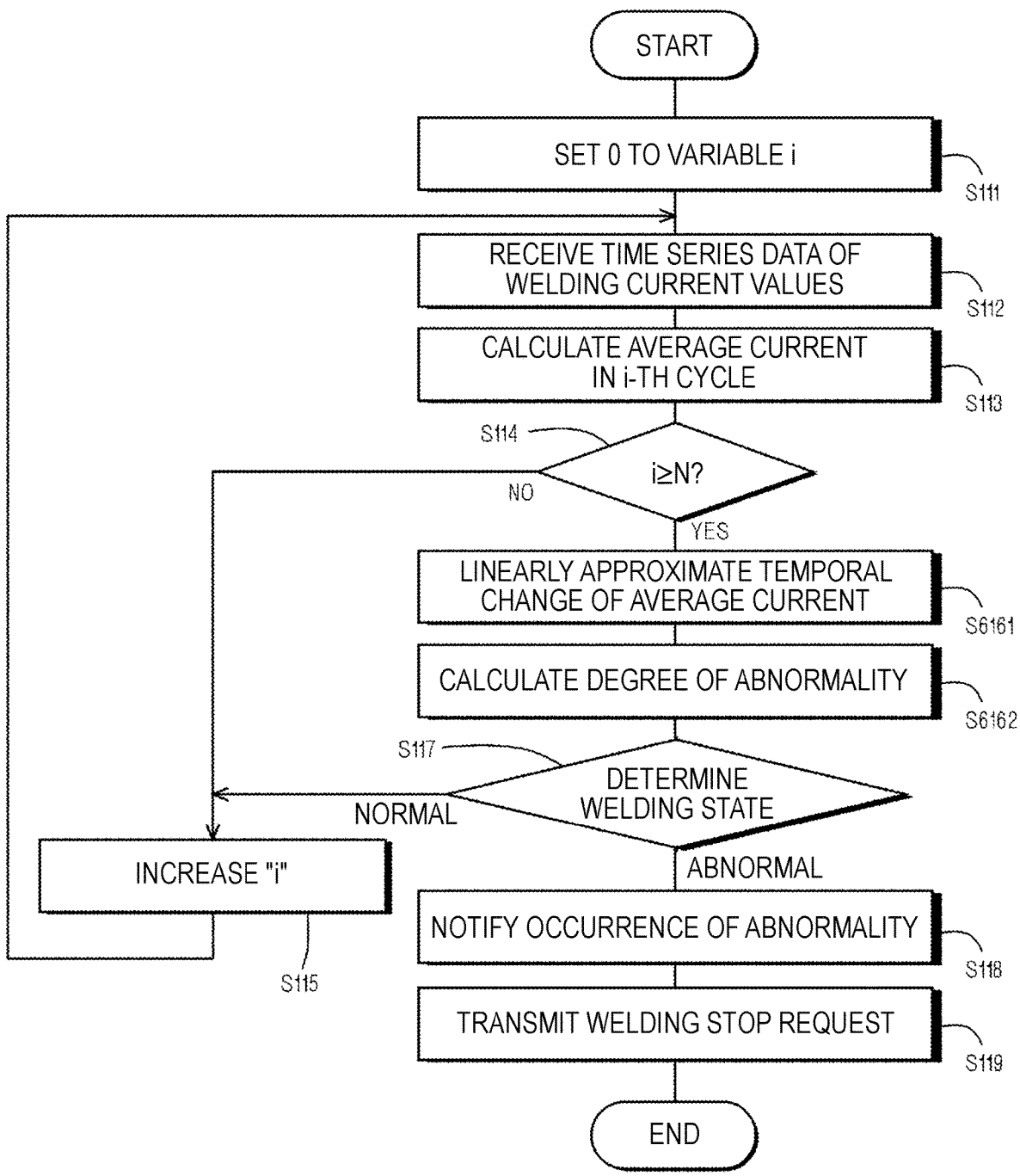

FIG. 22 is a flowchart illustrating an operation procedure of a welding state determination system according to Embodiment 6.

Figure 23:
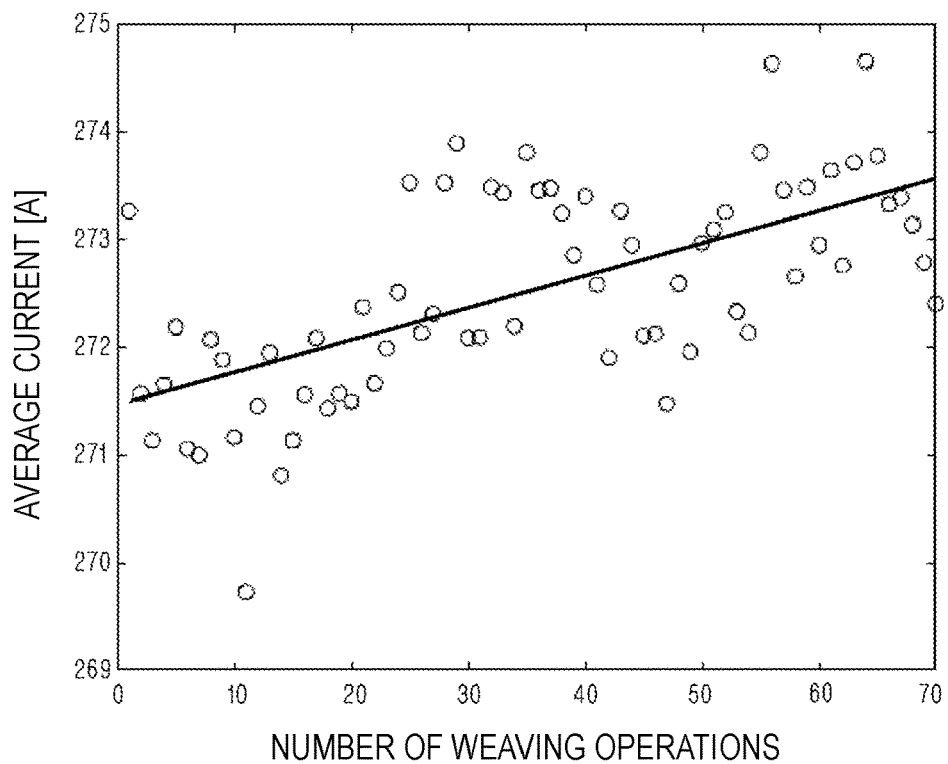

FIG. 23 is a graph illustrating a result of linear approximation in Evaluation Test 8.

Figure 24A:
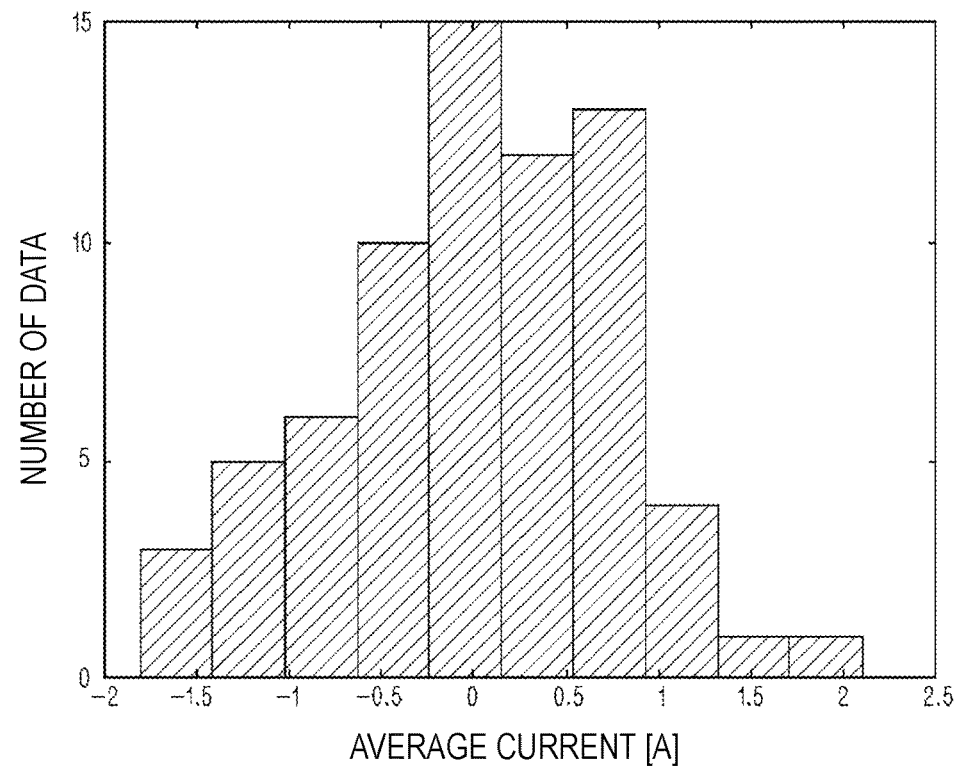

FIG. 24A is a histogram of a difference between an average current and an approximation value in Evaluation Test 8.

Figure 24B:
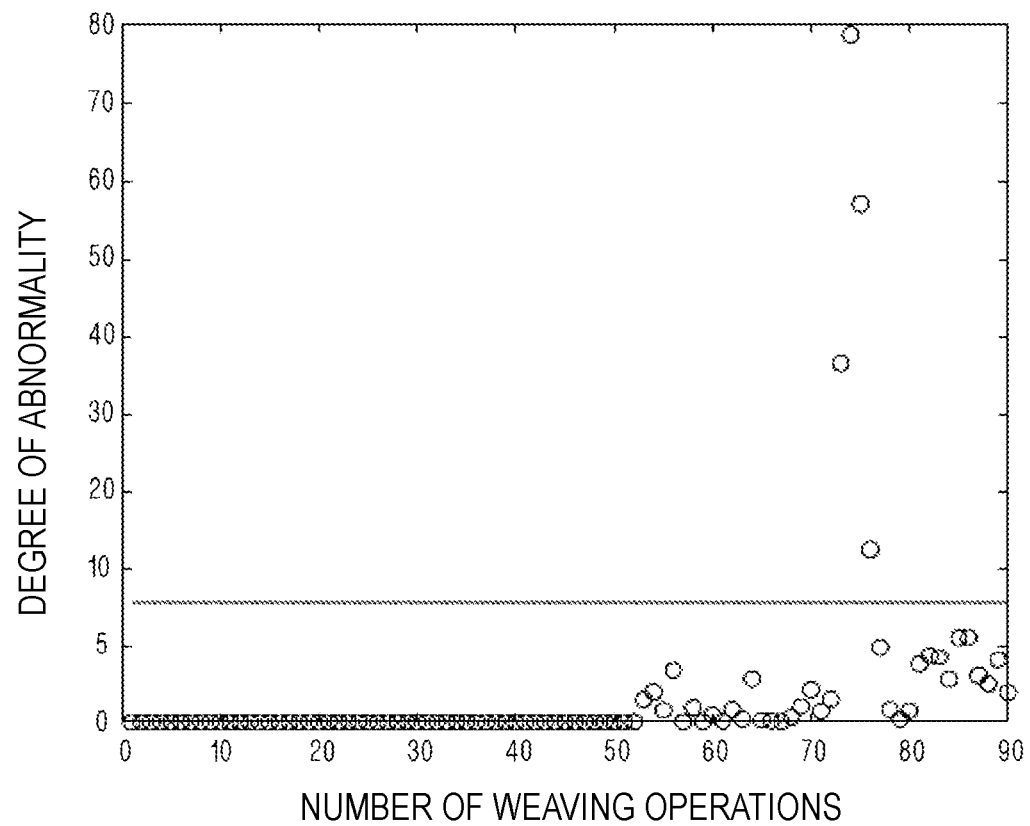

FIG. 24B is a graph illustrating a degree of abnormality calculated in Evaluation Test 8.

Figure 25:
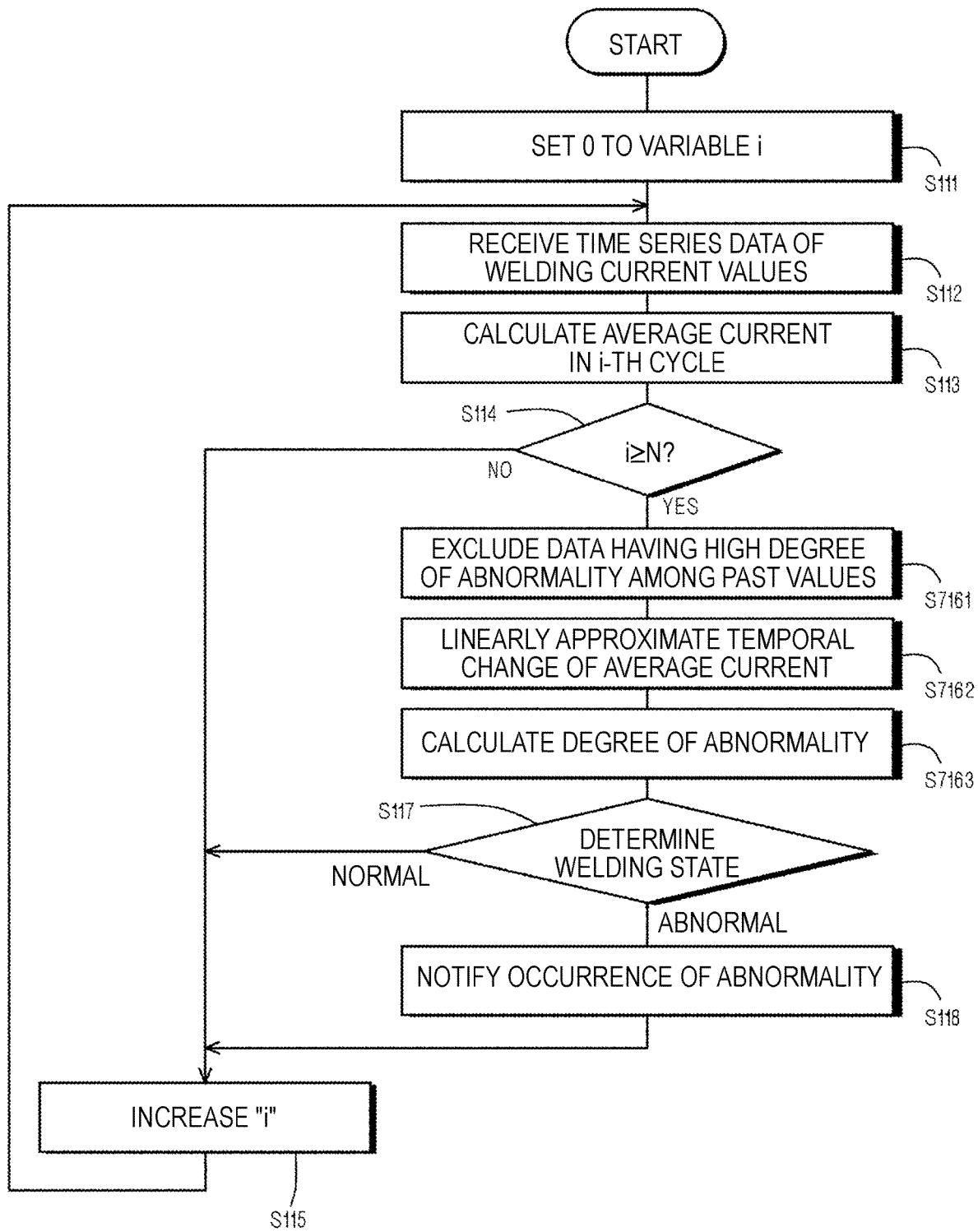

FIG. 25 is a flowchart illustrating an operation procedure of a welding state determination system according to Embodiment 7.

Figure 26:
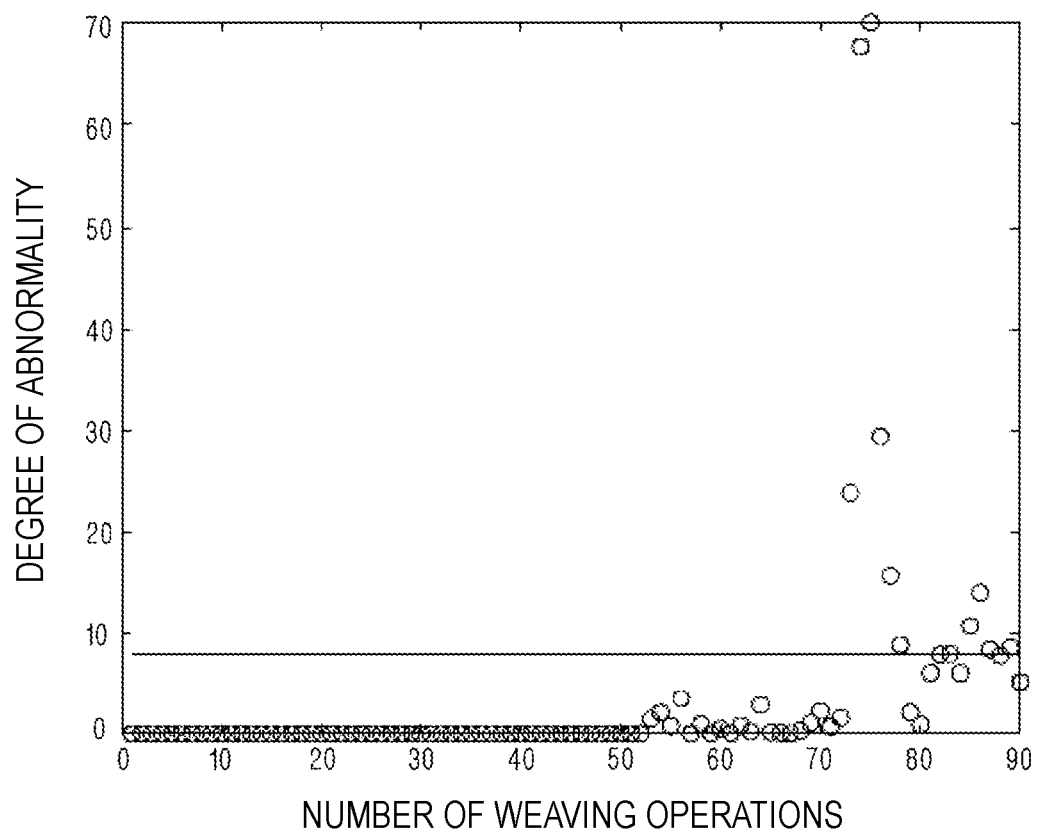

FIG. 26 is a graph illustrating a degree of abnormality calculated in Evaluation Test 9.

Figure 27:
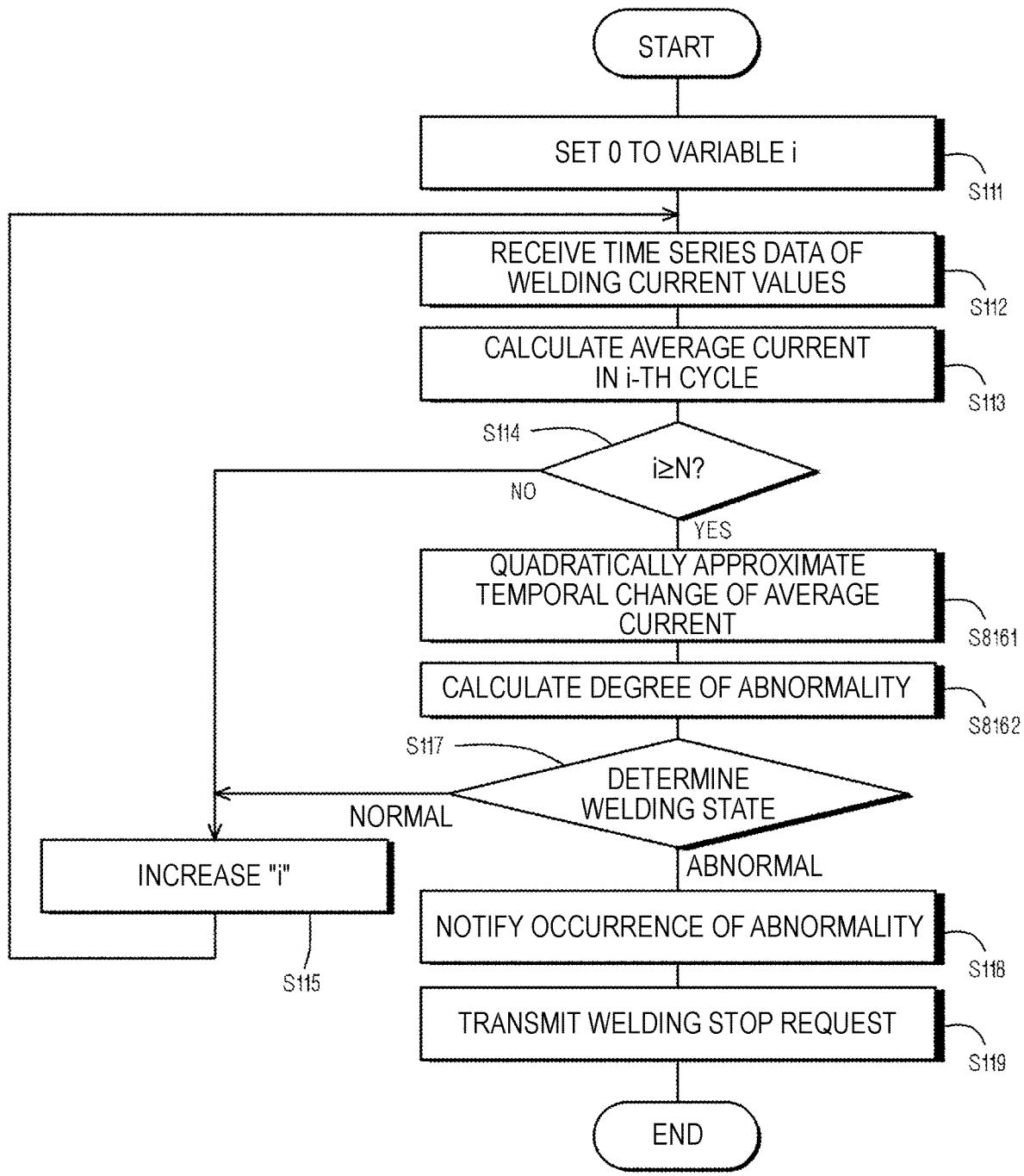

FIG. 27 is a flowchart illustrating an operation procedure of a welding state determination system according to Embodiment 8.

Figure 28:
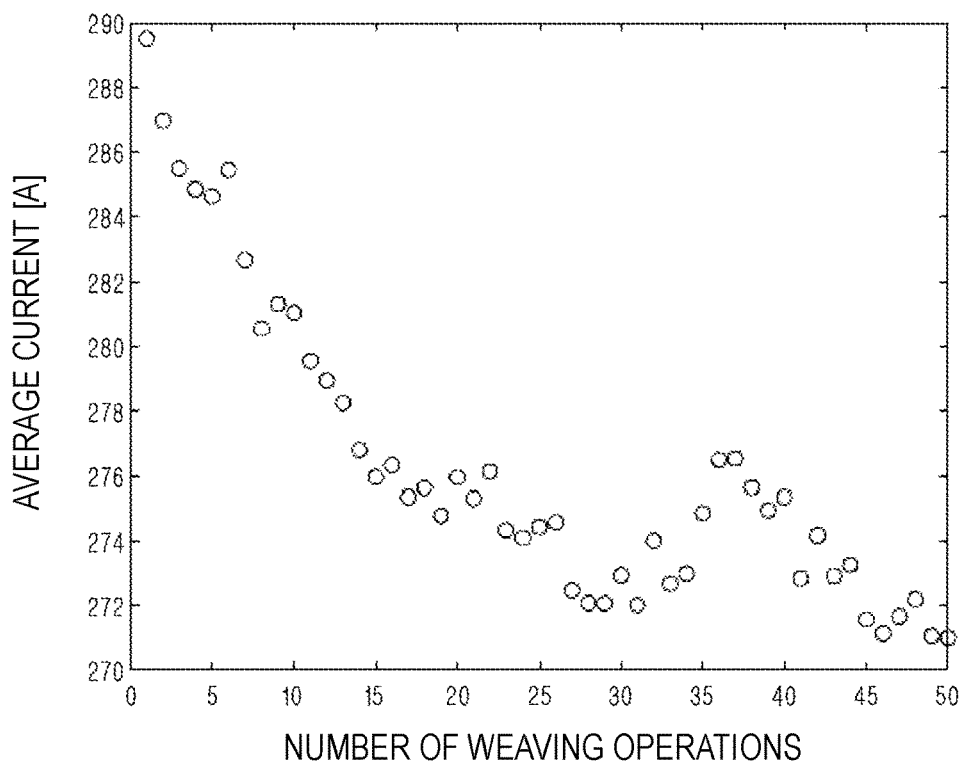

FIG. 28 is a graph illustrating a temporal change of an average current immediately after an arc start.

Figure 29A:
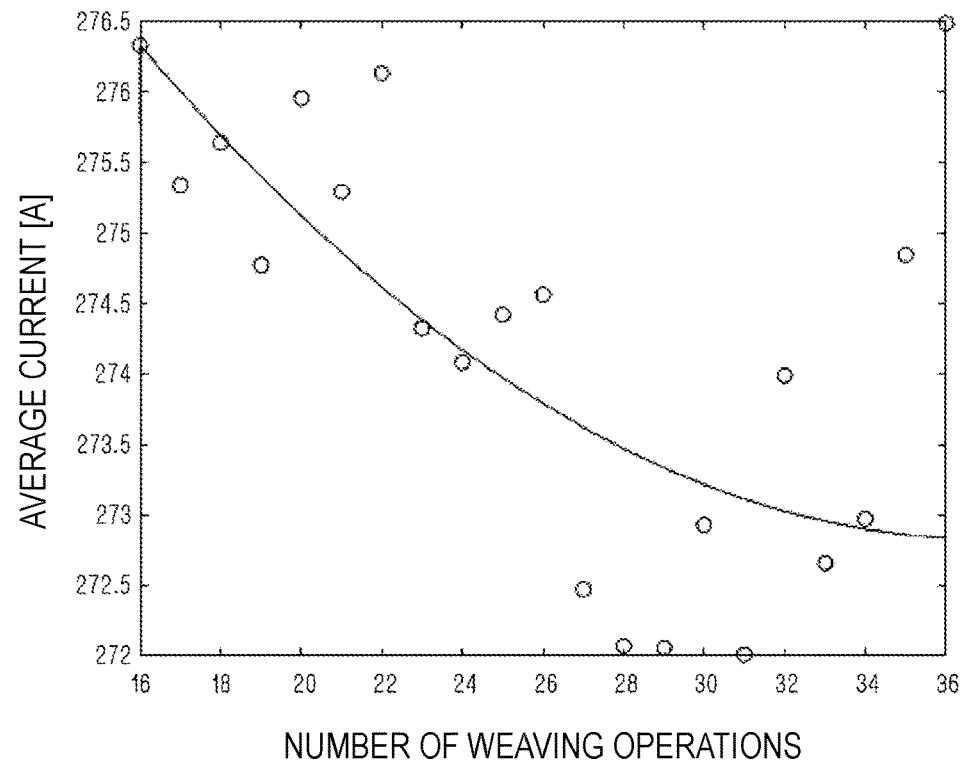

FIG. 29A is a graph illustrating the results of quadratic approximation in Evaluation Test 10.

Figure 29B:
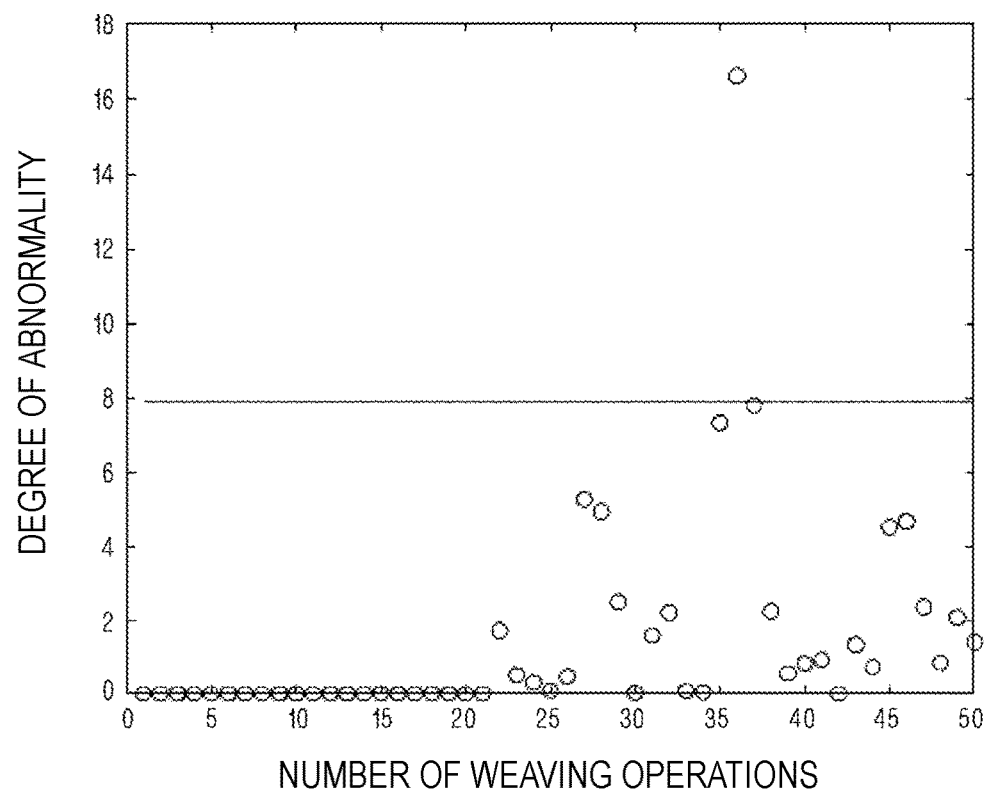

FIG. 29B is a graph illustrating a degree of abnormality calculated in Evaluation Test 10.

Figure 30:
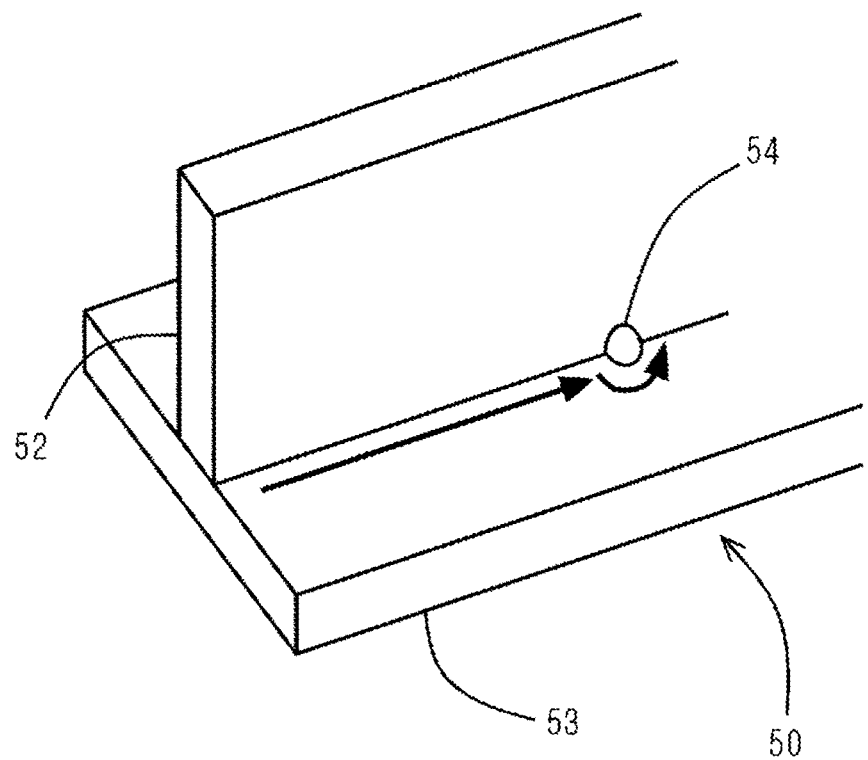

FIG. 30 is an explanatory view for explaining a welding with a tracking control on a workpiece to which a temporary track is performed.

Figure 31A:
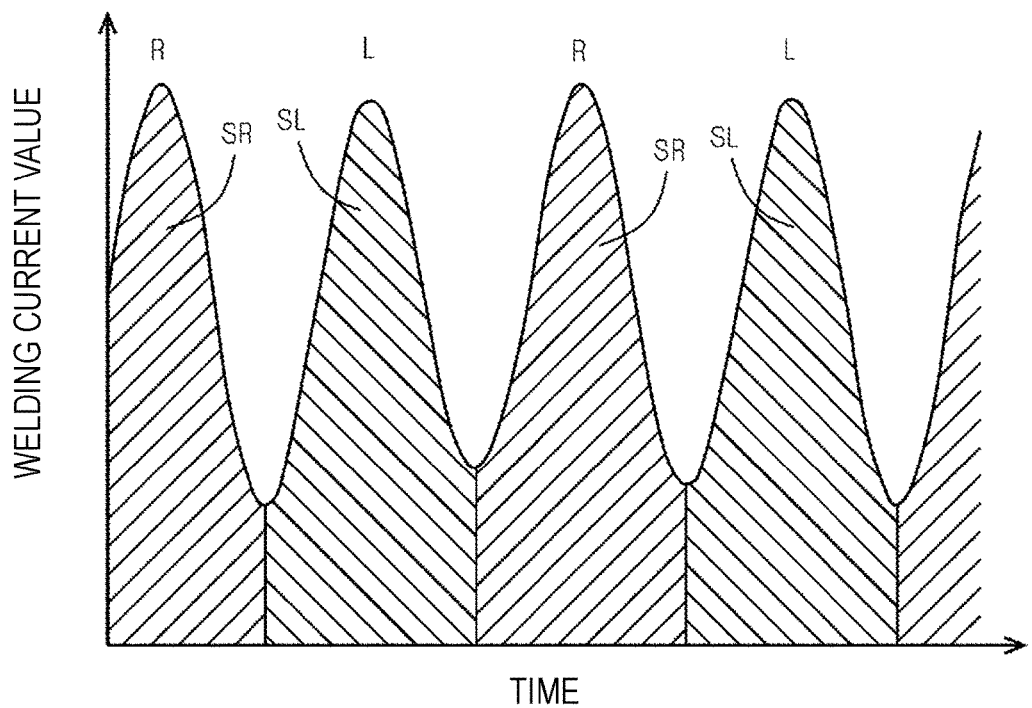

FIG. 31A is a graph for explaining an example of an integral value of a welding current in a certain section including an oscillation end.

Figure 31B:
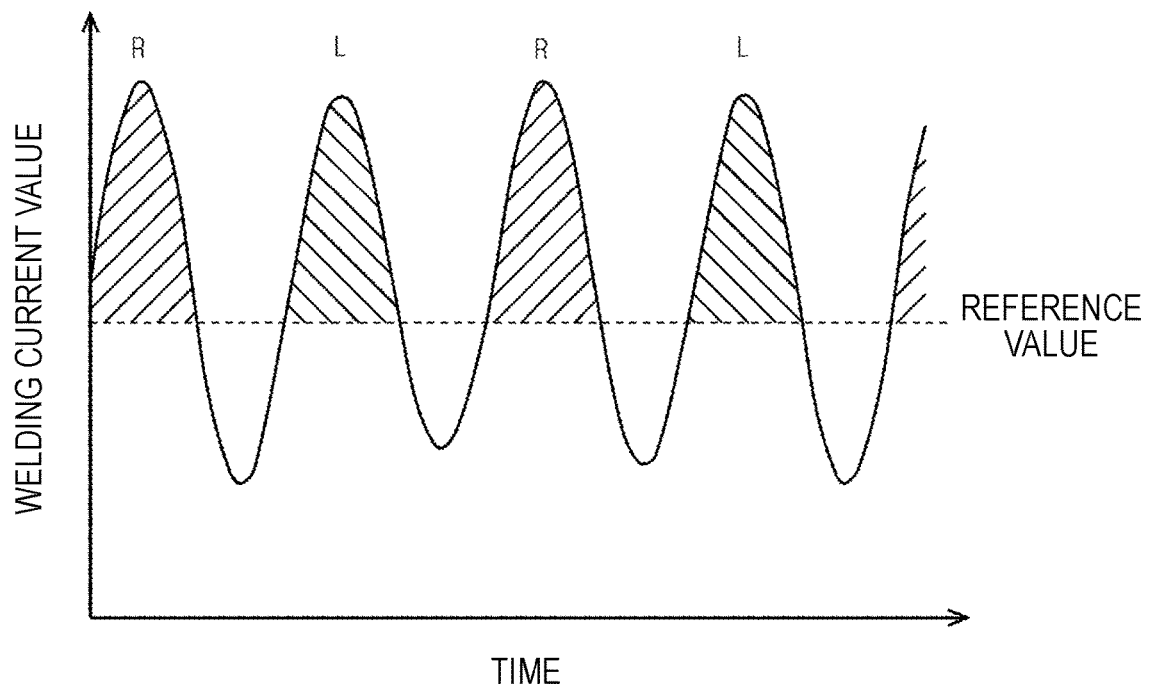

FIG. 31B is a graph for explaining another example of the integral value of the welding current in a certain section including the oscillation end.

MODES FOR CARRYING OUT THE INVENTION

Hereinafter, preferred embodiments of the present disclosure will be described with reference to the drawings. Each embodiment illustrated below is an example of a method and apparatus for embodying the technical idea of the present disclosure, and the technical idea of the present disclosure is not limited to the following. The technical idea of the present disclosure may be variously modified in the technical scope described in the claims. In each embodiment illustrated below, although the welding robot of the manipulator is described as an example, but the application of the present disclosure is not limited thereto, it is also possible to apply automatic welding devices other than manipulators.

Embodiment 1

In the present embodiment, the welding state determination system acquires an average value of welding current values in each weaving cycle as a characteristic amount for each weaving cycle, calculates a degree of abnormality for this characteristic amount, and determines a welding state based on the degree of abnormality.

<Configuration of Welding System>

Figure 1:
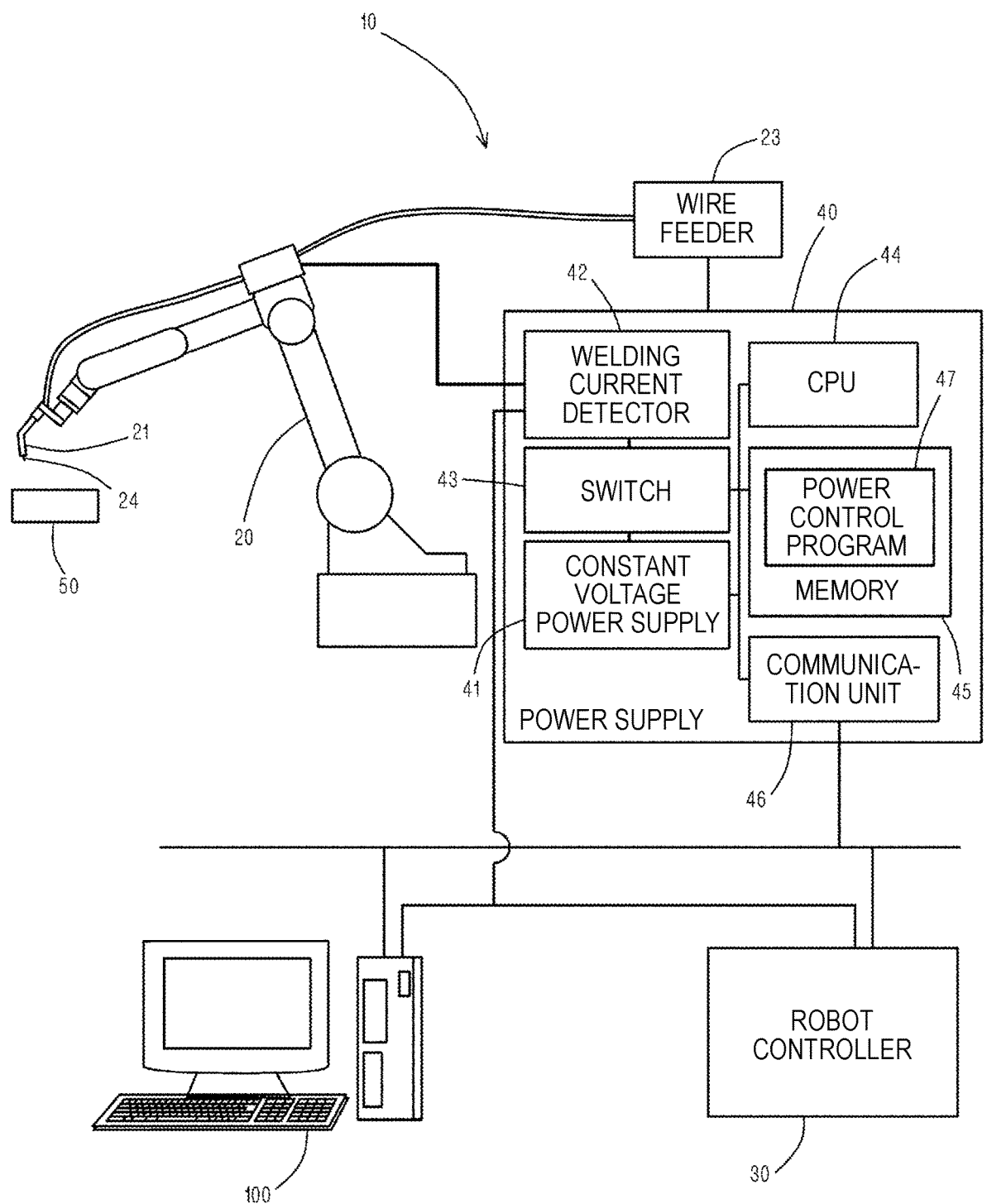
FIG. 1 is a schematic view illustrating a configuration of a welding system according to Embodiment 1.

FIG. 1 is a schematic view illustrating a configuration of a welding system according to the present embodiment. The welding system 10 includes a welding robot 20, a robot controller 30, a power supply 40, and a welding state determination system 100. The welding state determination system 100 determines the welding state by the welding robot 20.

The welding robot 20 is configured as a vertical articulated manipulator and includes a welding torch 21 at its tip. The welding robot 20 according to the present embodiment performs electrode type arc welding such as metal inert gas (MIG) welding or metal active gas (MAG) welding. The welding robot 20 is connected to the robot controller 30 and the power supply 40, respectively.

The welding wire 24 is fed from the wire feeder 23 to the welding torch 21, and the welding wire 24 is fed out from the tip of the welding torch 21. The power supply 40 has a constant voltage power supply 41, a welding current detector 42, and a switch 43. When the switch 43 is turned on, the welding wire 24 is supplied with power from the constant voltage power supply 41. Accordingly, a welding voltage is applied between the welding wire 24 and the workpiece (workpiece) 50, and an arc is generated. When the switch 43 is turned off, the power supply to the welding wire 24 is stopped and the generation of the arc is stopped. The welding current detector 42 detects a welding current generated during welding.

The power supply 40 further includes a CPU 44, a memory 45, and a communication unit 46. A power control program 47, which is a computer program for controlling the power supply, is stored in the memory 45, and the CPU 44 executes the power control program 47 to control a welding power, such as turning on and off the switch 43. The power supply 40 is connected to the wire feeder 23, and the CPU 44 controls the feeding speed of the wire with the power control program 47. The communication unit 46 is a communication module for wired or wireless communication. The communication unit 46 performs data communication between the robot controller 30 and the welding state determination system 100 using a predetermined communication protocol.

Figure 2:
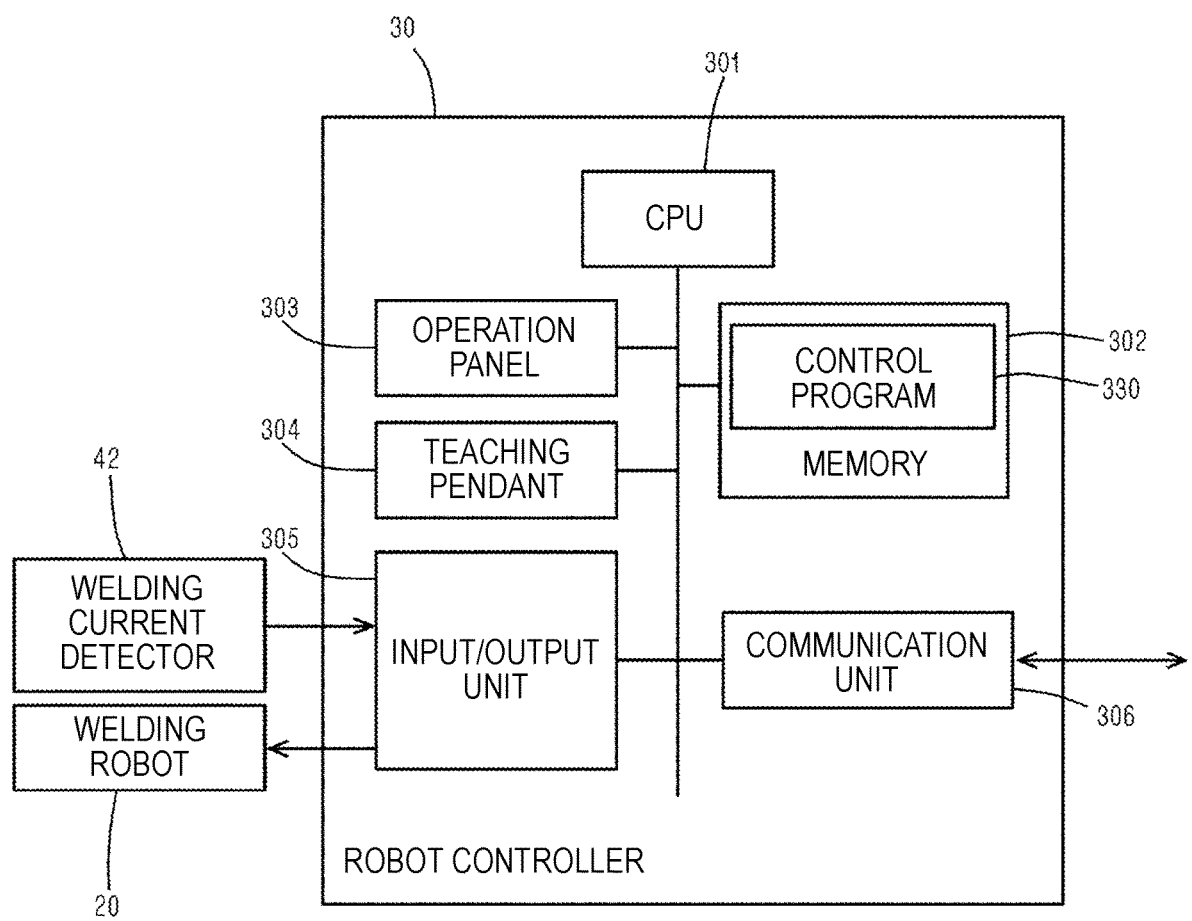
FIG. 2 is a block diagram illustrating a configuration of a robot controller.

Next, a configuration of the robot controller 30 will be described. The robot controller 30 controls an operation of the welding robot 20. FIG. 2 is a block diagram illustrating the configuration of the robot controller 30. The robot controller 30 includes a CPU 301, a memory 302, an operation panel 303 including a plurality of switches, a teaching pendant 304, an input/output unit 305, and a communication unit 306.

A control program 330, which is a computer program for controlling the welding robot 20, is stored in the memory 302, and the CPU 301 executes the control program 330 to control the welding operation with the welding robot 20.

The operation panel 303 and the teaching pendant 304 are used to input an instruction to the robot controller 30. An operator may input a teaching program to the teaching pendant 304. The robot controller 30 controls the welding robot 20 according to the teaching program input from the teaching pendant 304. The teaching program may also be created by a computer (not illustrated). In this case, the teaching program may be provided to the robot controller 30 by transferring by a portable recording medium or transmitting by data communication.

The welding current detector 42 and a drive circuit of an actuator of the welding robot 20 (not illustrated) are connected to the input/output unit 305. The value of the welding current detected by the welding current detector 42 is provided to the CPU 301 through the input/output unit 305. The CPU 301 controls the welding robot 20 as described below according to the control program 330, and outputs a control signal to a drive circuit of the welding robot 20.

The communication unit 306 is a communication module for wired or wireless communication. The communication unit 306 performs data communication between the power supply 40 and the welding state determination system 100 using a predetermined communication protocol.

The robot controller 30 having the configuration described above controls each axis of the welding robot 20 to control the position of the welding torch 21 and an extending length of the welding wire 24 from the welding torch 21 (hereinafter referred to as "wire length"). In the welding operation, the wire length is adjusted according to the distance between the welding torch 21 and the workpiece 50. That is, when the welding torch 21 approaches the workpiece 50, the wire length is reduced, and when the welding torch 21 moves away from the workpiece 50, the wire length is increased. A change in resistance occurs in the welding wire 24 according to increase and decrease in the wire length, and this change in resistance causes a change in the welding current value. For this reason, the robot controller 30 controls the position of the welding torch 21 and the wire length by performing a feedback control using welding current value to have an appropriate welding current value.

The robot controller 30 controls the welding robot 20 to perform weaving operation. The weaving operation is an operation of alternately oscillating the welding torch 21 in a direction intersecting the welding direction (hereinafter, the welding direction is referred to as "front", and the side on the right when viewed from the front is referred to as "right side", and the side on the left when viewed from the front is referred to as "left side"). The robot controller 30 controls the welding robot 20 to perform the weaving operation according to a set weaving cycle, amplitude, and welding speed.

The robot controller 30 executes welding seam tracking control together with the weaving operation described above. The welding seam tracking control is an operation of controlling the left and right positions of the welding torch 21 so that beads are formed along the welding seam.

Figure 3:
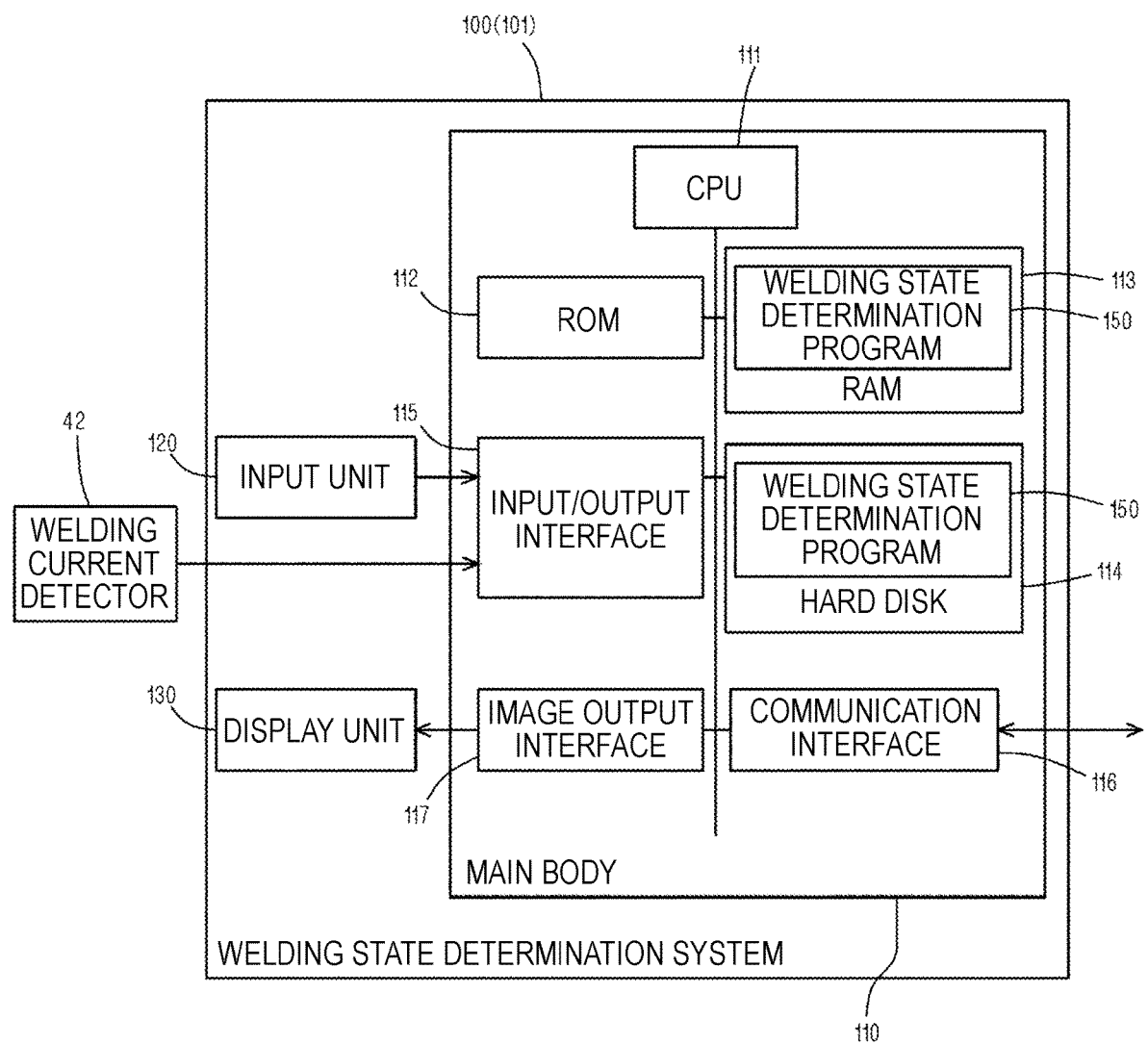
FIG. 3 is a block diagram illustrating a configuration of a welding state determination system according to Embodiment 1.

Next, a configuration of the welding state determination system 100 will be described. FIG. 3 is a block diagram illustrating the configuration of welding state determination system 100 according to the present embodiment. The welding state determination system 100 is realized by the computer 101. The computer 101 includes a main body 110, an input unit 120, and a display unit 130. The main body 110 includes a CPU 111, an ROM 112, a RAM 113, a hard disk 114, an input/output interface 115, a communication interface 116, and an image output interface 117. The CPU 111, the ROM 112, the RAM 113, the hard disk 114, the input/output interface 115, the communication interface 116, and the image output interface 117 are connected to each other by a bus.

When the CPU 111 executes a welding state determination program 150 which is a computer program for determining the state of arc welding, the computer 101 serves as the welding state determination system 100.

The ROM 112 stores a computer program executed by the CPU 111, data used for the same, and the like. The RAM 113 is used to read the welding state determination program 150 recorded on the hard disk 114. The RAM 113 is used as a work area of the CPU 111 when the CPU 111 executes the computer program.

The hard disk 114 is installed with various computer programs to be executed by the CPU 111, such as an operating system and an application program, and data used for executing the computer program. The welding state determination program 150 is also installed on the hard disk 114.

An input unit 120 including a keyboard and a mouse is connected to the input/output interface 115. The welding current detector 42 is connected to the input/output interface 115. The value of the welding current detected by the welding current detector 42 is provided to the CPU 111 through the input/output interface 115. The CPU 111 determines the state of arc welding using the welding current value according to the welding state determination program 150.

The communication interface 116 is a communication module for wired or wireless communication. The communication interface 116 performs data communication between the power supply 40 and the robot controller 30 using a predetermined communication protocol. The image output interface 117 is connected to the display unit 130 including an LCD, a CRT, and the like, and outputs a video signal corresponding to the image data supplied from the CPU 111 to the display unit 130. The display unit 130 displays an image (screen) according to the input image signal.

<Operation of Welding System>

Next, an operation of a welding system 10 will be described. When performing arc welding, an operator activates each of the robot controller 30, the power supply 40, and the welding state determination system 100. The robot controller 30 controls the operation of the welding robot 20, and the power supply 40 supplies welding power to the welding robot 20. The welding state determination system 100 determines the state of arc welding by the welding robot 20 in real time.

Figure 4:
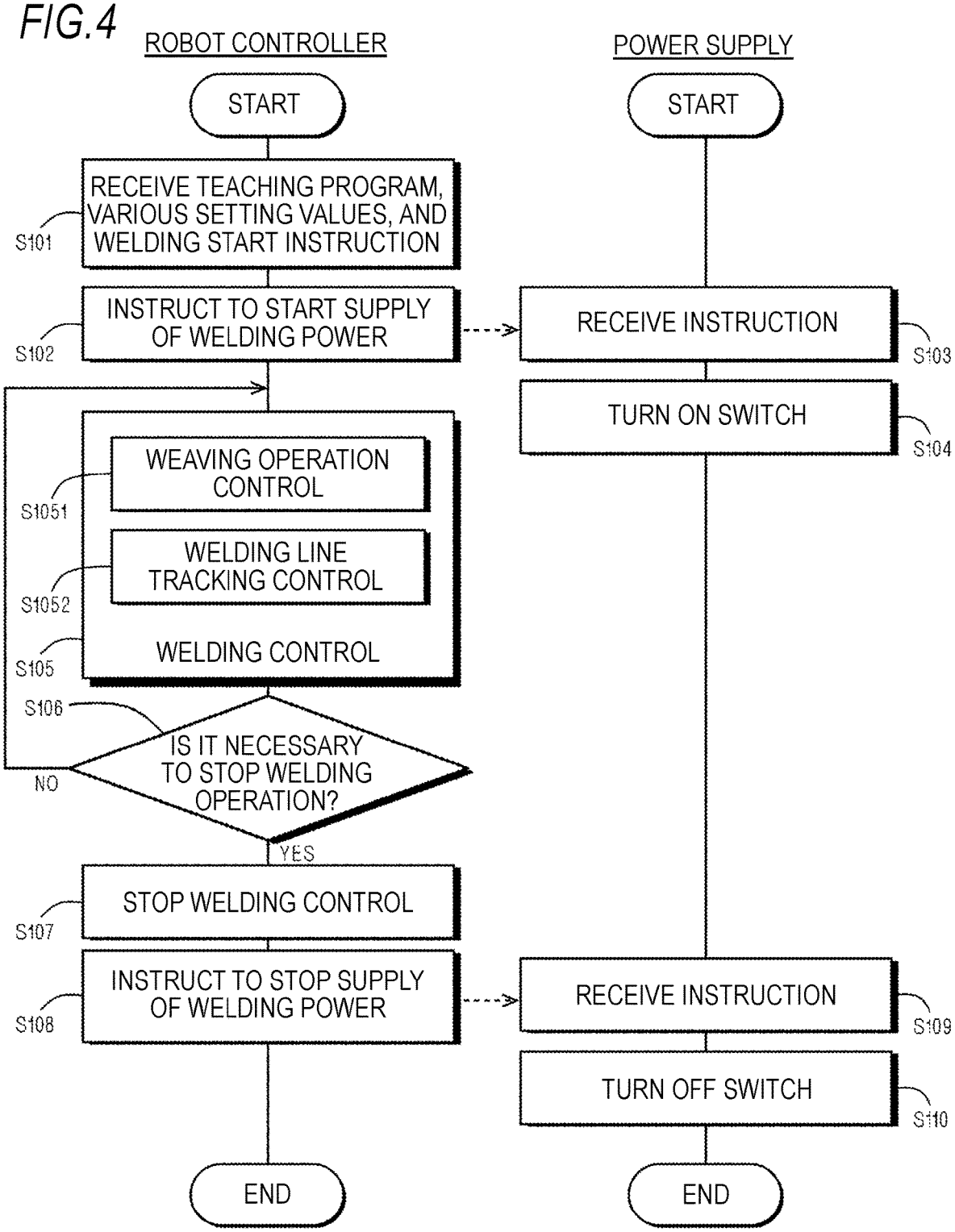
FIG. 4 is a flowchart illustrating an operation procedure of the robot controller and a power supply.

The operations of the robot controller 30 and the power supply 40 will be described. FIG. 4 is a flowchart illustrating the operation procedure of the robot controller 30 and the power supply 40. When the operator starts arc welding, the operator operates the teaching pendant 304 to input a teaching program and various setting values to the robot controller 30, and instructs to start welding. The CPU 301 of the robot controller 30 receives the teaching program, various setting values, and the instruction to start welding (step S101).

The CPU 301 instructs the power supply 40 to start supply of welding power (step S102). The power supply 40 receives the instruction (step S103), and the CPU 44 turns on the switch 43 (step S104). Accordingly, a welding voltage is applied between the welding wire 24 and the workpiece 50, and an arc is generated.

Next, the CPU 301 transmits a control signal to the welding robot 20 and executes welding control (step S105). The welding control includes control of the weaving operation (step S1051) and welding seam tracking control (step S1052). In the welding control, feedback control of the position of the welding torch 21 and the wire length using welding current values is also performed.

The CPU 301 determines whether it is necessary to stop the welding operation (step S106). When it is not necessary to stop the welding operation (NO in step S106), the CPU 301 returns the process to step S105, and sequentially executes the welding control.

For example, when there is any one of reception of instruction to stop welding from the operator, detection of welding end position by a sensor provided in the welding robot 20, detection of welding abnormality, or reception of a request to stop welding from the welding state determination system 100, the CPU 301 determines that it is necessary to stop the welding operation (YES in step S106), stops the welding control (step S107), and instructs the power supply 40 to stop the supply of welding power (step S108). The power supply 40 receives the instruction (step S109), and the CPU 44 turns off the switch 43 (step S110) to stop the supply of welding power to the welding robot 20. Thus, the operations of the robot controller 30 and the power supply 40 are ended.

Figure 5:
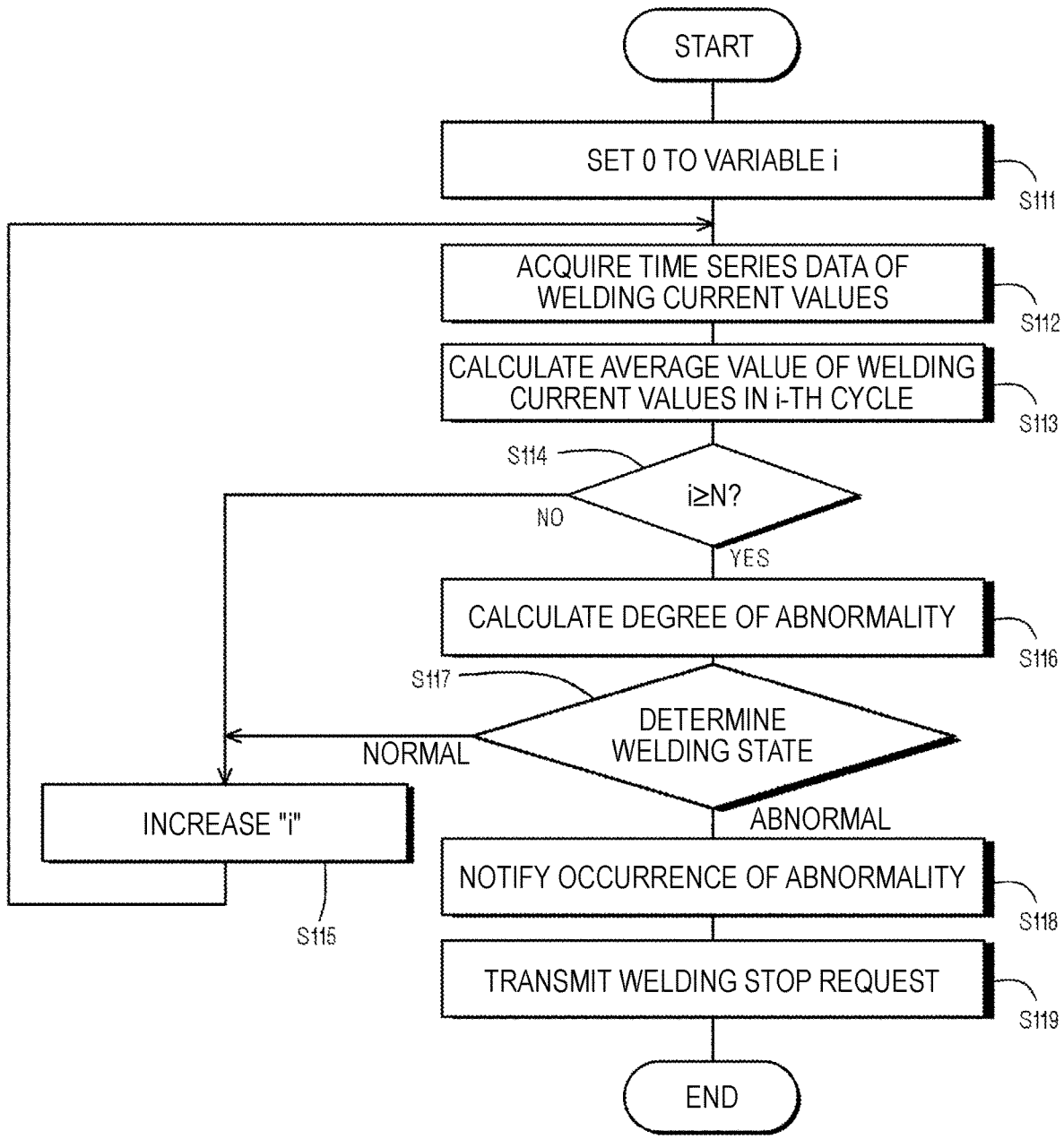
FIG. 5 is a flowchart illustrating an operation procedure of the welding state determination system according to Embodiment 1.

Next, an operation of the welding state determination system 100 will be described. FIG. 5 is a flowchart illustrating an operation procedure of the welding state determination system 100. First, the CPU 111 of the welding state determination system 100 sets an initial value 0 to a variable i indicating the cycle (the number of times) of the weaving operation (step S111).

In the power supply 40, the welding current detector 42 continuously detects the welding current value and outputs a result as a detection value. The CPU 111 receives time series data of the welding current value from the welding current detector 42 (step S112).

Figure 6A:
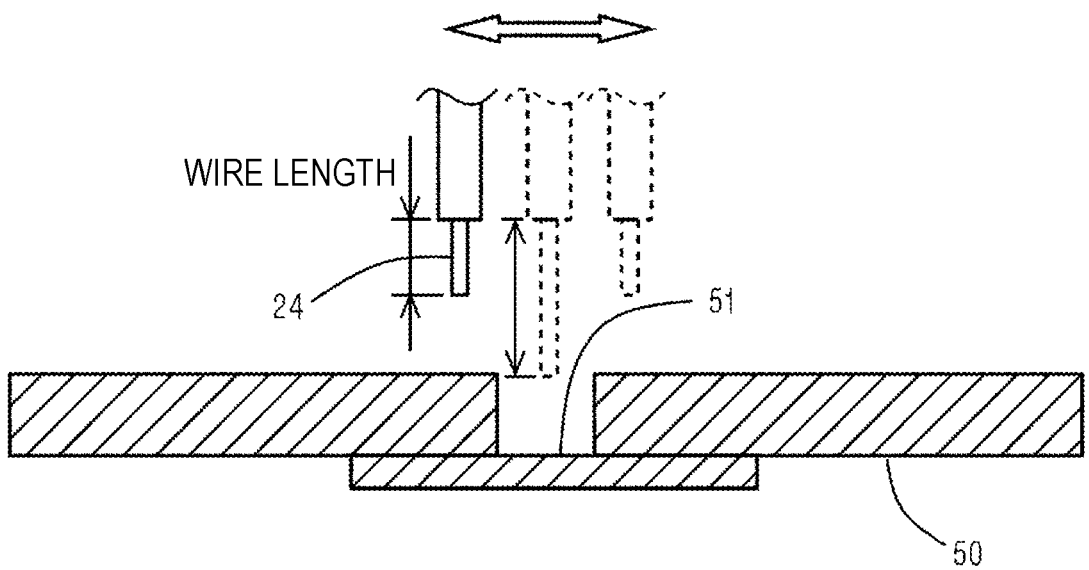
FIG. 6A is an explanatory view for explaining a change in a wire length in a weaving operation.
Figure 6B:
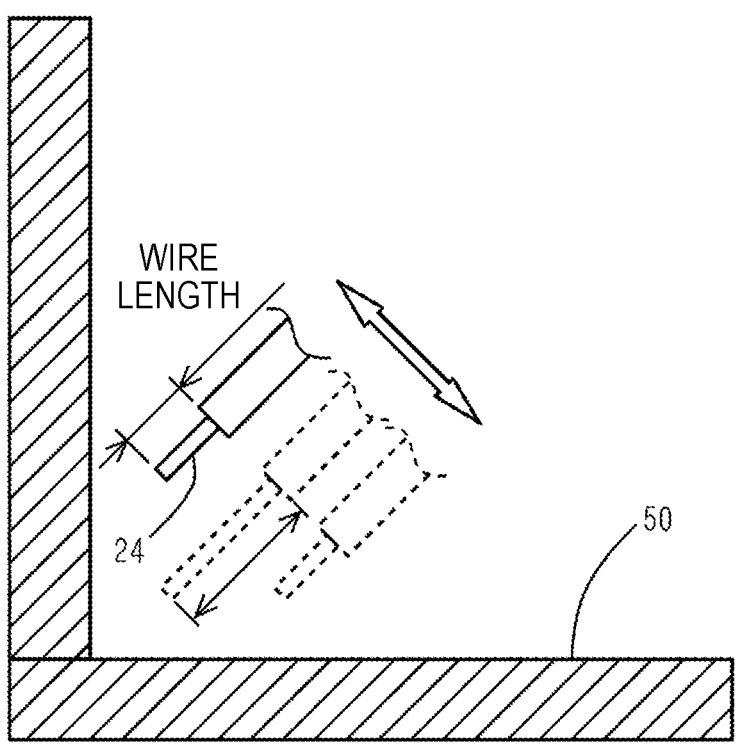
FIG. 6B is an explanatory view for explaining a change in a wire length in a weaving operation.

The welding current value will be described below. In the weaving operation, the position of the welding wire 24 is changed to the left and right with respect to the welding direction. In such weaving operation, the distance between the tip of the welding torch 21 and the welding position of the workpiece 50 is changed according to the positional change of the welding wire 24 in the left-and-right direction, and the wire length is changed accordingly. At this time, the wire length is controlled such that the distance between the tip of the welding wire 24 and the welding position of the workpiece 50, that is, an arc length is substantially constant. FIGS. 6A and 6B are explanatory views for explaining a change in the wire length in the weaving operation. When the workpiece 50 is a butt joint, as illustrated in FIG. 6A, a groove 51 is provided between the two abutted workpieces 50. For this reason, the distance between the welding torch 21 and the workpiece 50 is varied between when the welding wire 24 faces the groove 51 and when the welding wire 24 faces the abutted workpiece 50. Therefore, the wire length is changed according to this distance. When the workpiece 50 is a T joint, a cross joint, a square joint, and the like, as illustrated in FIG. 6B, the two workpieces 50 are arranged to intersect with each other. This intersection is the welding seam. The wire length is the longest when the welding wire 24 faces the intersection (the connection between the two workpieces 50), and the wire length is decreased as the welding wire 24 is moved away from this intersection toward a direction intersecting with the welding direction (the arrowed direction in the drawing). For this reason, the welding current value changes according to the cycle of the weaving operation.

Reference is made to FIG. 5 again. The CPU 111 calculates an average value of welding current values in the i-th cycle (hereinafter, referred to as "average current") as a characteristic amount (step S113). The CPU 11 determines whether the number of calculated data i of the characteristic amount reaches a predetermined number N (Step S114), and when the number of data i is less than N (NO in Step S114), increases "i" (step S115) and returns the process to step S112. As a result, characteristic amounts are obtained in each of a plurality of consecutive cycles.

On the other hand, when the number of data i is equal to or greater than N (YES in step S114), the CPU 111 calculates a degree of abnormality (step S116). The degree of abnormality is defined by the following equation.

Degree of abnormality=((observation value−average)/standard deviation)$^2$      [Formula 1]

Here, the observation value refers to the characteristic amount in the cycle of interest (in this case, i, that is, the latest cycle). The average value is an average value of a plurality of characteristic amounts acquired prior to the cycle of interest (hereinafter referred to as "past values"), and the standard deviation is a standard deviation of the past values.

The degree of abnormality in the present embodiment will be described in more detail. With respect to the average current $1_{ave}(i)$ in the i-th cycle of the weaving operation, the average value of the past values is given by Equation (1), the standard deviation is given by Equation (2), and the degree of abnormality is given by Equation (3) as follows.

[Formula 2]

$$\hat{\mu}(I_{ave}(i)) = \frac{1}{N} \sum_{j=i-N}^{i-1} I_{ave}(j) \quad (1)$$

$$\hat{\sigma}^2(I_{av}(i)) = \frac{1}{N} \sum_{j=i-N}^{i-1} (I_{ave}(j) - \hat{\mu}(I_{ave}(i)))^2 \quad (2)$$

$$a(I_{ave}(i)) = \left( \frac{I_{ave}(i) - \hat{\mu}(I_{ave}(i))}{\hat{\sigma}(I_{ave}(i))} \right)^2 \quad (3)$$

That is, the average value is the average of the past values of the number of data N immediately prior to the cycle i, and the standard deviation is a standard deviation of the past values of the number of data N. Such degree of abnormality is a statistical value indicating the degree to which the behavior of the observation value differs with respect to the N past values. Here, since the welding current value is greatly varied from cycle to cycle, when N is too small, the values of the average and the standard deviation are unstable, and it is impossible to accurately calculate the degree of abnormality reflecting the welding state. Therefore, it is preferable that N be larger. On the other hand, when N is too large, the period for acquiring data is lengthened, and accordingly, it is preferable that N be small for practical reasons. For this reason, specifically, N is preferably equal to or greater than 30 and equal to or less than 100.

In particular, in a case of using a shielding gas with less noise such as Ar—$CO_2$ mixed gas, it is preferable to set N to be equal to or greater than 30 and equal to or less than 50. However, when there is a problem with accuracy, it is conceivable to set N to be equal to or greater than 50.

Next, the CPU 111 determines the welding state based on the calculated degree of abnormality (step S117). In this process, the CPU 111 determines whether it is necessary to stop the welding operation based on the degree of abnormality. When the degree of abnormality exceeds a predetermined reference value, it is determined that the welding state is abnormal and it is necessary to stop the welding operation. When the degree of abnormality is equal to or less than the reference value, it is determined that the welding state is normal and it is not necessary to stop the welding operation. The reference value may be given by the operator or may be set automatically by the CPU 111. In the automatic setting, a predetermined value in the chi-squared distribution may be used as a reference value. This predetermined value may be determined in consideration of the rate of abnormality in a welding. For example, when the probability of abnormality in the welding is 0.5%, 0.5% in the chi-squared distribution may be set as the reference value.

When the CPU 111 determines that the welding state is normal ("normal" in step S117), the process proceeds to step S115. On the other hand, when determining that the welding state is abnormal ("abnormal" in step S117), the CPU 111 causes the display unit 130 to display a screen notifying the occurrence of an abnormality (step S118), and transmits a welding stop request to the robot controller 30 (step S119). When the robot controller 30 receives the welding-related request, the welding control is stopped and the supply of welding power to the welding robot 20 is stopped. As described above, the operation of the welding state determination system is ended.

With the above configuration, the welding state determination system 100 calculates the degree of abnormality of a welding state as a statistical numerical value of the observation values with respect to the N past values. Such a degree of abnormality is determined only by the past values and the observation values, and therefore, is not influenced by the welding state such as the object to be welded, the shielding gas, and the set current. Therefore, even when the welding state is changed, the welding state determination system 100 may calculate the degree of abnormality according to the welding state at that time without changing the setting values or the like, and may determine the welding state with high accuracy.

As described above, the computer 101 serves as an acquisition unit that acquires, for each cycle, characteristic amount related to physical quantities that change according to the cycle of the weaving operation, a calculation unit that calculates a degree of abnormality from the characteristic amount acquired by the acquisition unit, a determination unit that determines a welding state based on the degree of abnormality calculated by the calculation unit, and an abnormality notification unit that notifies an abnormality when it is determined that the welding state is abnormal. The robot controller 30 also serves as a controller that controls an operation of arc welding based on the determination result of the welding state by the determination unit.

<Evaluation Test 1>

Figure 7:
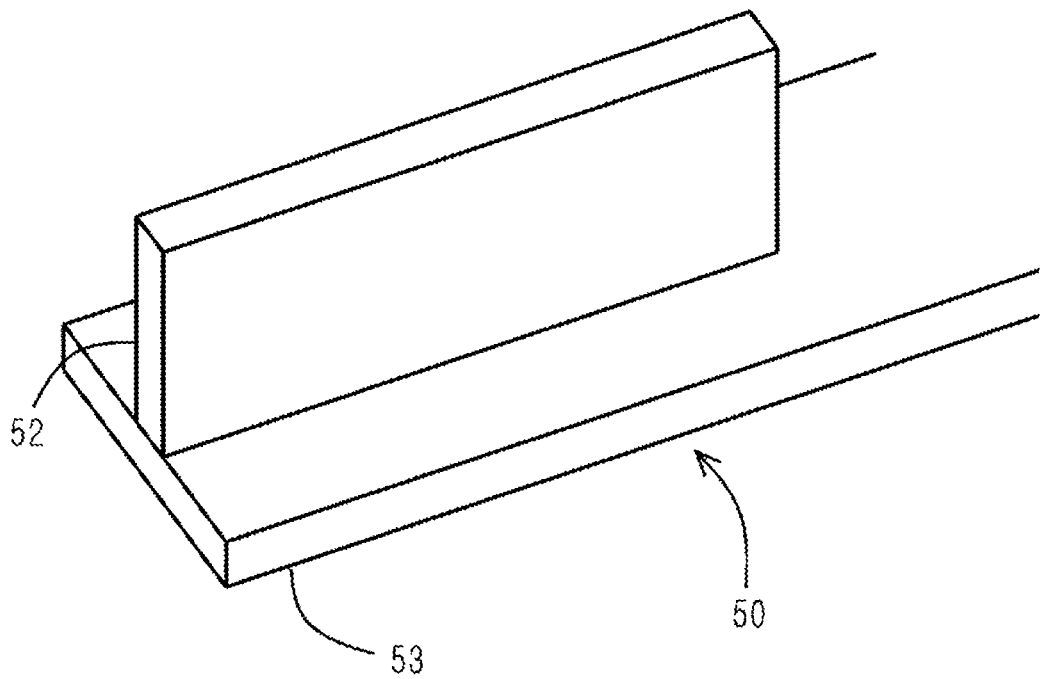
FIG. 7 is a perspective view illustrating a workpiece used in Evaluation Test 1.

The inventors carried out an evaluation test of the welding state determination method according to the present embodiment as follows and verified its performance. FIG. 7 is a perspective view illustrating the workpiece 50 used in the present evaluation test. In this evaluation test, a T joint composed of a standing plate 52 and a lower plate 53 was used as the workpiece 50. The welding was performed by fillet welding to weld an intersection of the standing plate 52 and the lower plate 53. The standing plate 52 has a shorter length than that of the lower plate 53 in the welding direction (longitudinal direction) and is missing from the middle of the welding direction of the lower plate 53. In this evaluation test, the welding was performed along a portion having the presence of the standing plate 52 to a portion where the standing plate terminates, and it was verified whether the terminating end of the standing plate 52 could be detected as a change in the welding state. In this evaluation test, the weaving frequency was 2 Hz and the number of data N was 40.

Figure 8A:
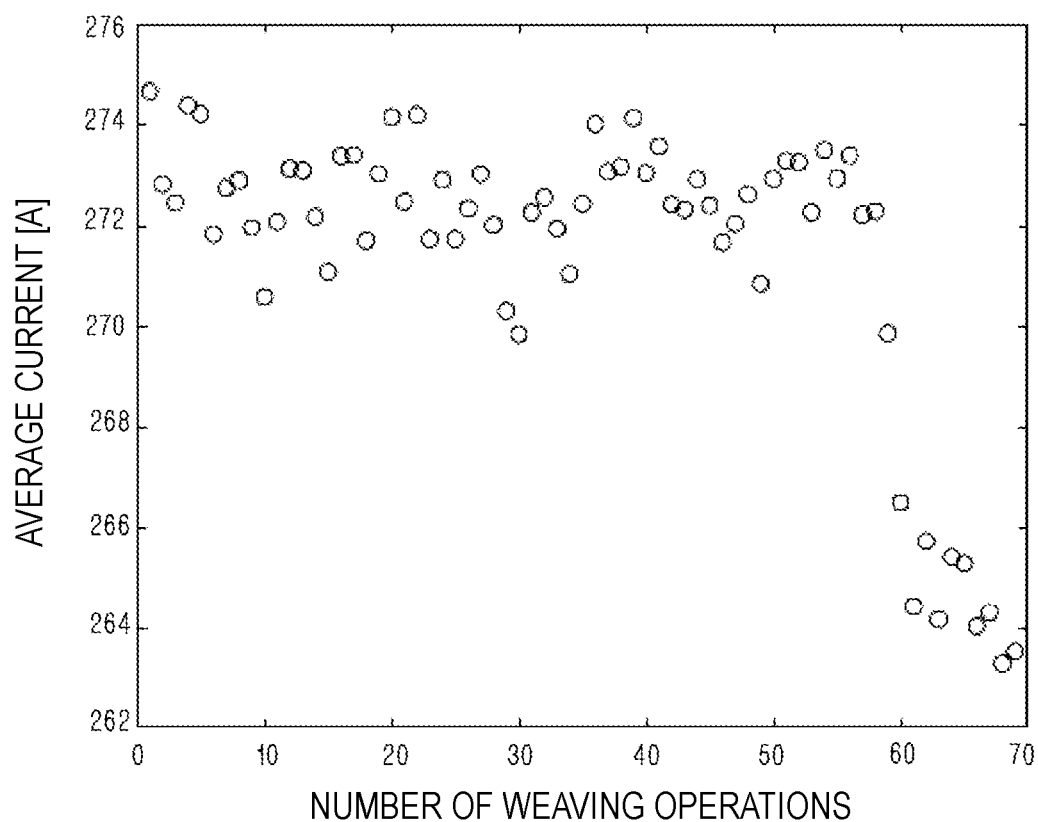
FIG. 8A is a graph illustrating an average current measured in Evaluation Test 1.

The average current $l_{ave}$ in each cycle of the weaving operation was calculated, and the degree of abnormality of the average current was calculated using Equations (1) to (3) described above. FIG. 8A is a graph illustrating the average current $l_{ave}$ measured in this evaluation test. In FIG. 8A, the horizontal axis indicates the number of weaving operations (one cycle is one time), and the vertical axis indicates the average current $l_{ave}$. As illustrated in FIG. 8A, when the number of weavings is 1 to 57, the average current is about 270 A to 275 A, while after the 59th number of weavings, the average cycle current decreases to 267 A or less. The 59th cycle corresponds to the end of the standing plate 52, and the result of FIG. 8A illustrates that the average current decreases due to the absence of the standing plate 52 after the 59th cycle.

Figure 8B:
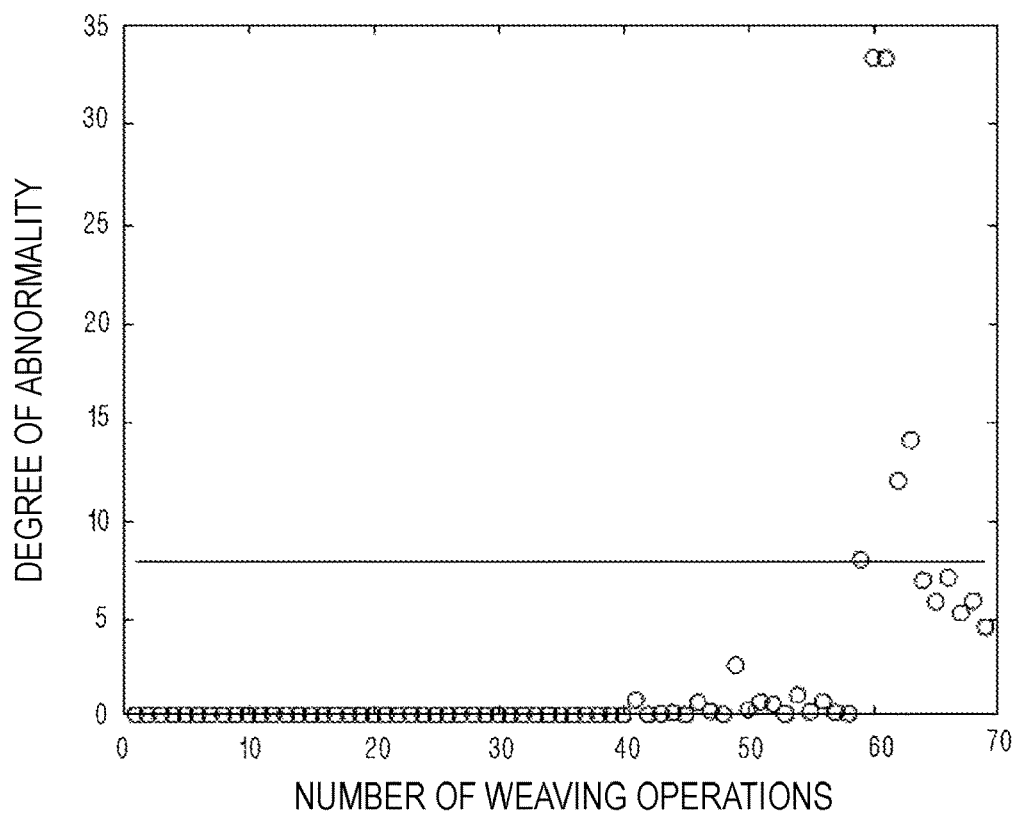
FIG. 8B is a graph illustrating a degree of abnormality calculated in Evaluation Test 1.

FIG. 8B is a graph illustrating the degree of abnormality calculated in the present evaluation test. In FIG. 8B, the horizontal axis indicates the number of weaving operations, and the vertical axis indicates the degree of abnormality. As illustrated in FIG. 8B, at the 1st to 57th times, the degree of abnormality was approximately 0, while at the 59th to 63rd times, the degree of abnormality exceeded the reference value. In this evaluation test, the reference value is set to a value 7.879439 of 0.5% in the chi-squared distribution. Since the number of weavings at which the degree of abnormality exceeds the reference value is the 59th time corresponding to the end point of the standing plate 52, it can be seen that the terminating end of the standing plate 52 may be accurately detected as a change in the welding state. After the 64th time, the degree of abnormality was lower than the reference value again. This is considered to be due to the fact that data having a high degree of abnormality for welding the portion without the standing plate 52 is included in the past value.

<Evaluation Test 2>

Figure 9:
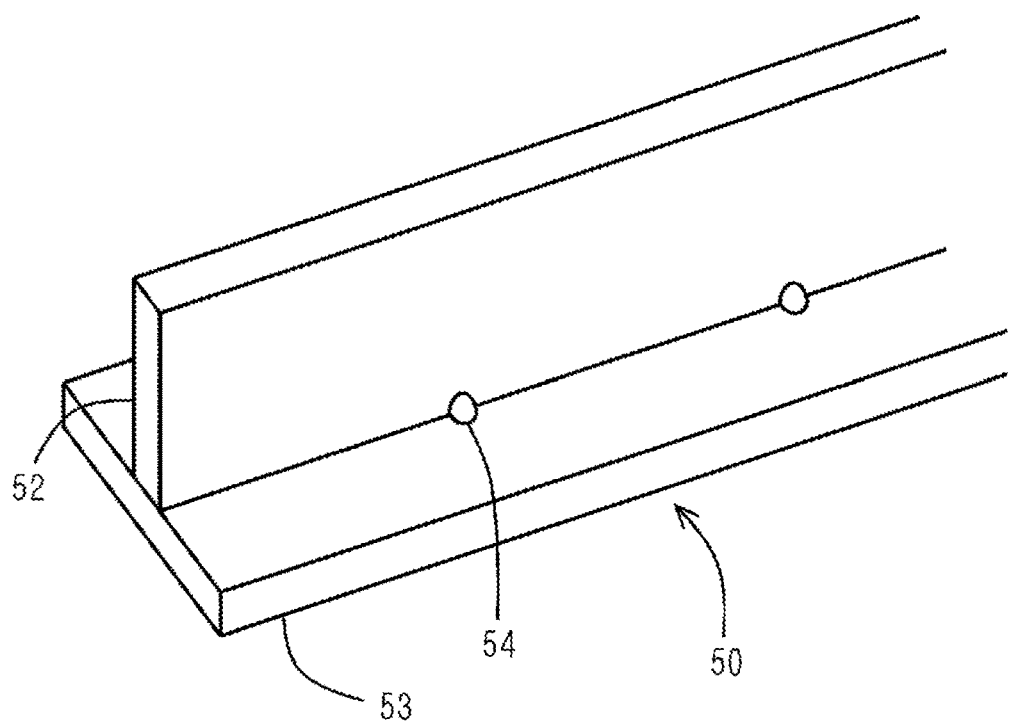
FIG. 9 is a perspective view illustrating a workpiece used in Evaluation Test 2.

Next, the inventors carried out an evaluation test using the T-joint subjected to temporary track as a workpiece. FIG. 9 is a perspective view illustrating the workpiece 50 used in the present evaluation test. In this evaluation test, the workpiece 50 formed with temporary track 54 at several places at the intersection of a T-joint composed of the standing plate 52 and the lower plate 53 was used. The welding was performed by fillet welding that welded the intersection of the standing plate 52 and the lower plate 53. In this evaluation test, the welding was performed along the intersection, from a portion where there was no temporary track 54 to a portion where there was the temporary track 54, and it was verified whether the temporary track 54 could be detected as a change in the welding state. In this evaluation test, the weaving frequency was 2 Hz as in Evaluation Test 1 and the number of data N was 50. In carrying out the test, the other conditions were the same as in Evaluation Test 1.

Figure 10A:
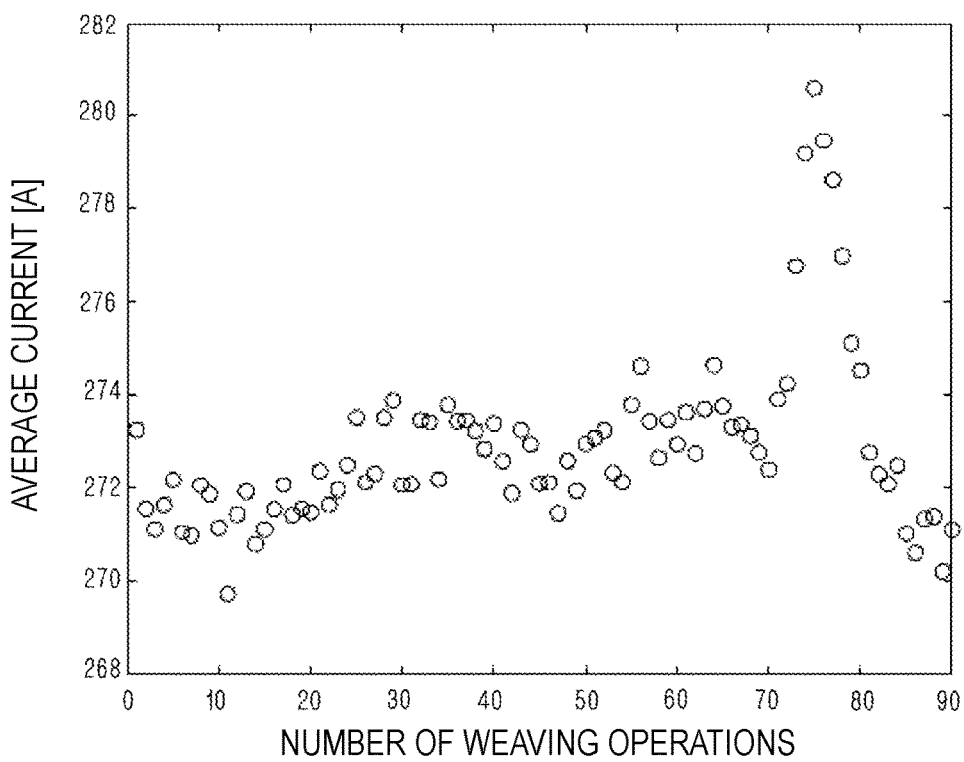
FIG. 10A is a graph illustrating an average current measured in Evaluation Test 2.

FIG. 10A is a graph illustrating the average current $l_{ave}$ measured in this evaluation test. In FIG. 10A, the horizontal axis indicates the number of weaving operations, and the vertical axis indicates the average current $l_{ave}$. As illustrated in FIG. 10A, when the number of weavings is 1 to 72, the average current is about 270 A to 275 A, while after the 73rd weaving, the average current is increased sharply. The 73rd time corresponds to the position of the temporary track 54, and the result of FIG. 10A illustrates that the average current was increased due to the presence of the temporary track 54 after the 73rd time. That is, this data represents that the average current is changed significantly due to the influence of the temporary track 54 after the 73rd time.

Figure 10B:
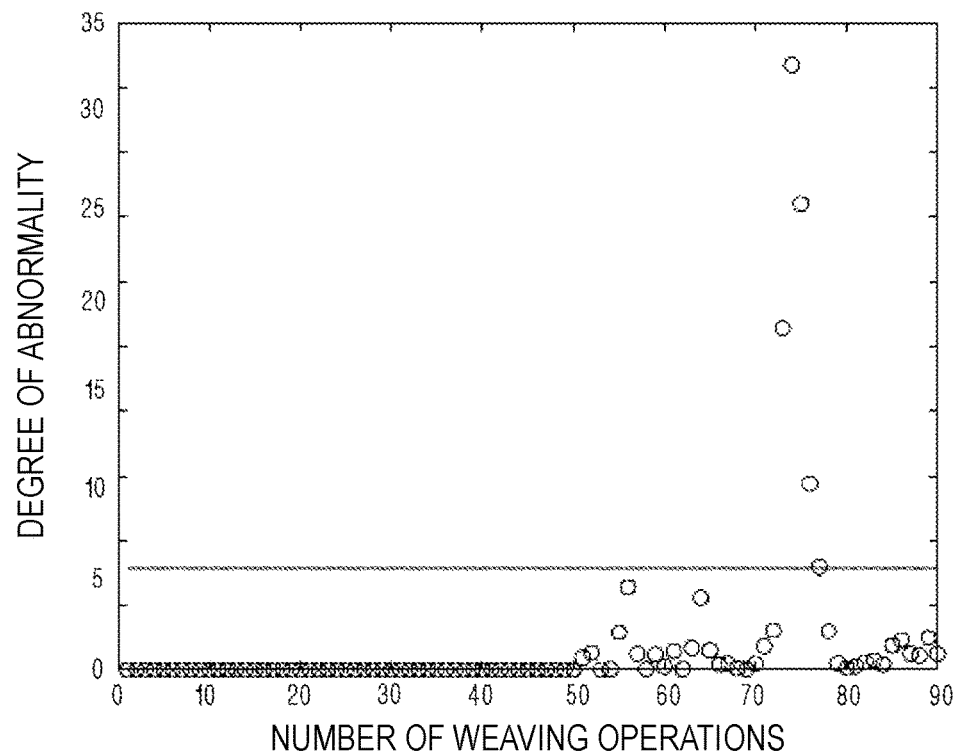

FIG. 10B is a graph illustrating the degree of abnormality calculated in the present evaluation test. In FIG. 10B, the horizontal axis indicates the number of weaving operations, and the vertical axis indicates the degree of abnormality. As illustrated in FIG. 10B, at the 1st to 72th times, the degree of abnormality was equal to or less than the reference value, while at the 73th to 77th times, the degree of abnormality exceeded the reference value. Since the number of weavings at which the degree of abnormality exceeds the reference value is the 73rd time that corresponds to the position of the temporary track 54, it can be seen that the temporary track 54 may be accurately detected as a change in the welding state.

<Evaluation Test 3>

Next, the inventors generated burn through on the workpiece by setting a target current value high, and verified whether the burn through could be detected as a change in the welding state. In this evaluation test, the weaving frequency was 2 Hz as in Evaluation Test 1 and the number of data N was 10. In carrying out this test, the other conditions were the same as in Evaluation Test 1.

FIG. 11A is a graph illustrating the average current $l_{ave}$ measured in this evaluation test. In FIG. 11A, the horizontal axis indicates the number of weaving operations, and the vertical axis indicates the average current $l_{ave}$. As illustrated in FIG. 11A, when the number of weavings is 1 to 18, the average current varies at about 350 A to 320 A. In this evaluation test, the burn through occurred at the 18th to 19th number of weavings. While the average current decreased at the 19th time due to the influence of the burn through, the amount of reduction was not large, and it was difficult to detect the burn through with the average current.

FIG. 11B is a graph illustrating the degree of abnormality calculated in the present evaluation test. In FIG. 11B, the horizontal axis indicates the number of weaving operations, and the vertical axis indicates the degree of abnormality. As illustrated in FIG. 11B, at the 1st to 17th times, the degree of abnormality was equal to or less than the reference value, while at the 18th to 19th times, the degree of abnormality exceeded the reference value. Since the number of weavings at which the degree of abnormality exceeds the reference value is the 18th and 19th times in which the burn through has occurred, it may be seen that the burn through may be accurately detected as a change in welding state.

Embodiment 2

In the welding state determination method according to Embodiment 1, the degree of abnormality temporarily is increased when the welding state is changed rapidly, but when the abnormal welding state continues, the data with a high degree of abnormality is included in the past values, resulting in decreased degree of abnormality calculated using these past values (see FIGS. 8B, 10B, and 11B). In the present embodiment, the welding state determination system excludes from the past values the characteristic amounts of which the degree of abnormality has exceeded a predetermined reference value in the past, to calculate the average and the standard deviation, and uses these average and the standard deviation to calculate the degree of abnormality. Accordingly, when an abnormal welding state continues, the abnormality may be detected continuously.

<Configuration of Welding System>

The configuration of the welding system according to the present embodiment is the same as the configuration of the welding system 10 according to Embodiment 1, and thus the same components are denoted by the same reference numerals and the description thereof is omitted.

<Operation of Welding System>

Next, an operation of the welding system according to the present embodiment will be described. The operations of the robot controller 30 and the power supply 40 are the same as those described in Embodiment 1, and thus the description thereof is omitted.

The operation of the welding state determination system 100 will be described. FIG. 12 is a flowchart illustrating an operation procedure of the welding state determination system 100 according to the present embodiment. Steps S111 to S115 are the same as those described in Embodiment 1, and thus the description thereof is omitted.

The CPU 111 excludes, among the N past values, a past value including an average current of when the degree of abnormality calculated previously exceeds the reference value (step S2161). When the degree of abnormality exceeds the reference value, it may be estimated that the welding state is abnormal. Therefore, by excluding such data with a high degree of abnormality, the past values include only the average current of time point when the welding state is normal.

Next, the CPU 111 calculates an average value and a standard deviation of past values from which data having a high degree of abnormality has been excluded, and calculates the degree of abnormality based on the same (step S2162). It is assumed that there are M abnormal currents exceeding the reference value among the average currents $I_{ave}$ from the (i–N)th to the (i–1)th times. The data of these M average currents are denoted by $I'_{ave}(i, 1), I'_{ave}(i, 2), I'_{ave}(i, 3), \ldots, I'_{ave}(i, M)$, and a collection of these is denoted by $I'_{ave}(i)$. With respect to the average current $I'_{ave}(i)$ in the i-th cycle of the weaving operation, the average value of the past values excluding data with a high degree of abnormality is given by Equation (4), and the standard deviation is given by Equation (5), and the degree of abnormality is given by Equation (6) as follows.

[Formula 3]

$$\hat{\mu}(I'_{ave}(i)) = \frac{1}{M}\sum_{j=1}^{M} I'_{ave}(i, j) \quad (4)$$

$$\hat{\sigma}^2(I'_{ave}(i)) = \frac{1}{M}\sum_{j=1}^{M} (I'_{ave}(i, j) - \hat{\mu}(I'_{ave}(i)))^2 \quad (5)$$

$$a(I'_{ave}(i)) = \left(\frac{I_{ave}(i) - \hat{\mu}(I'_{ave}(i))}{\hat{\sigma}(I'_{ave}(i))}\right)^2 \quad (6)$$

The CPU 111 determines the welding state based on the calculated degree of abnormality (step S117). This process is the same as that described in Embodiment 1. When the CPU 111 determines that the welding state is normal ("normal" in step S117), the process proceeds to step S115. On the other hand, when determining that the welding state is abnormal ("abnormal" in step S117), the CPU 111 causes the display unit 130 to display a screen for notifying the occurrence of an abnormality (step S118). In the present embodiment, after the notification of the occurrence of an abnormality, the CPU 111 proceeds the process to step S115 without transmitting a welding stop request. Thus, even when it is determined that the welding state is abnormal, the calculation of the degree of abnormality and determination of the welding state are continuously performed.

With the above configuration, the characteristic amounts of when a welding state is abnormal are excluded from the past values, so that the degree of abnormality is calculated, which accurately reflects the welding state without being influenced by abnormal characteristic amounts in the past, and when the abnormal welding state continues, this abnormality may be detected continuously.

As described above, the computer 101 with this configuration operates so that the calculation unit described above calculates the degree of abnormality for each cycle. When the degree of abnormality calculated in a cycle prior to a certain cycle is greater than a predetermined reference value, the computer 101 serves as an exclusion unit that excludes the characteristic amounts used as the observation value in the calculation of the degree of abnormality in the previous cycle from a plurality of past values. This is the same in Embodiment 7 described below.

<Evaluation Test 4>

The inventors carried out an evaluation test of the welding state determination method according to the present embodiment as follows and verified its performance. The workpiece, the weaving frequency, and the number of data N are the same as in Evaluation Test 1.

The average current of when the degree of abnormality exceeded the reference value was excluded from the past values, the average value and the standard deviation were calculated, and the degree of abnormality was calculated from the same. The data of the average current used to calculate the degree of abnormality is the same as in Evaluation Test 1. FIG. 13 is a graph illustrating the degree of abnormality calculated in the present evaluation test. In FIG. 13, the horizontal axis indicates the number of weaving operations, and the vertical axis indicates the degree of abnormality. As illustrated in FIG. 13, the degree of abnormality exceeds the reference value after the 59th number of weaving. The degree of abnormality exceeded the reference value also after the 64th time while the degree of abnormality did not exceed the reference value after the 64th time in Evaluation Test 1. The standing plate 52 terminates after the 59th time, and the degree of abnormality accurately reflects the change in the welding state. Thus, it may be seen that changes in the welding state may be accurately detected without being influenced by data having a high degree of abnormality.

Embodiment 3

In the present embodiment, the welding state determination system acquires a welding current value at an oscillation end of a weaving operation as a characteristic amount for each weaving cycle, calculates a degree of abnormality for this characteristic amount, and determines a welding state based on the degree of abnormality.

<Configuration of Welding System>The configuration of the welding system according to the present embodiment is the same as the configuration of the welding system 10 according to Embodiment 1, and thus the same components are denoted by the same reference numerals and the description thereof is omitted.

<Operation of Welding System>

Next, an operation of the welding system according to the present embodiment will be described. The operations of the robot controller 30 and the power supply 40 are the same as those described in Embodiment 1, and thus the description thereof is omitted.

The operation of the welding state determination system 100 will be described. FIG. 14 is a flowchart illustrating an operation procedure of the welding state determination system 100 according to the present embodiment. Steps S111 and 112 are the same as those described in Embodiment 1, and thus the description thereof is omitted.

The CPU 111 extracts welding current values at the left end and the right end (hereafter, the welding current value at the left end is referred to as "left end current", and the welding current value at the right end is referred to as "right end current") of the oscillation in the i-th cycle of the weaving operation as a characteristic amount from the measured value of the welding current (Step S313). Steps S114 and S115 are the same as those described in Embodiment 1, and thus the description thereof is omitted.

The CPU 111 calculates a degree of abnormality for each of the left end current and the right end current (step S316). For each of the left end current $I_L(i)$ and the right end current $I_R(i)$ in the i-th cycle of the weaving operation, the average value of the past values is given by Equations (7) and (8), the standard deviation is given by Equations (9) and (10), and the degree of abnormality is given by Equations (11) and (12) as follows.

[Formula 4]

$$\hat{\mu}(I_L(i)) = \frac{1}{N} \sum_{j=i-N}^{i-1} I_L(j) \quad (7)$$

$$\hat{\mu}(I_R(i)) = \frac{1}{N} \sum_{j=i-N}^{i-1} I_R(j) \quad (8)$$

$$\hat{\sigma}^2(I_L(i)) = \frac{1}{N} \sum_{j=i-N}^{i-1} (I_R(j) - \hat{\mu}(I_R(i)))^2 \quad (9)$$

$$\hat{\sigma}^2(I_R(i)) = \frac{1}{N} \sum_{j=i-N}^{i-1} (I_R(j) - \hat{\mu}(I_R(i)))^2 \quad (10)$$

$$a(I_L(i)) = \left(\frac{I_L(i) - \hat{\mu}(I_L(i))}{\hat{\sigma}(I_L(i))}\right)^2 \quad (11)$$

$$a(I_R(i)) = \left(\frac{I_R(i) - \hat{\mu}(I_R(i))}{\hat{\sigma}(I_R(i))}\right)^2 \quad (12)$$

Next, the CPU 111 determines the welding state at each of the left end and the right end of the weaving operation based on the abnormality degree for each of the calculated left end current and the right end current. In this process, the CPU 111 compares each of the degree of abnormality of the left end current and the degree of abnormality of the right end current with the reference value separately, and when any degree of abnormality exceeds the reference value, determines that the welding state is abnormal and it is necessary to stop the welding operation. When both degrees of abnormality are equal to or less than the reference value, it is determined that the welding state is normal and it is not necessary to stop the welding operation.

Steps S118 and S119 are the same as those described in Embodiment 1, and thus the description thereof is omitted.

The welding state may be different between the left end and the right end in the oscillation of the weaving operation. For example, when there is a defect only in a part of the workpiece, and the left end in the oscillation of the weaving operation passes the defect but not the right end, only the welding state at the left end is abnormal. Therefore, by calculating the degree of abnormality for each of the left end current and the right end current as described above, it is possible to accurately detect the change in the welding state at the left end of the weaving operation.

<Evaluation Test 5>

The inventors carried out an evaluation test of the welding state determination method according to the present embodiment as follows and verified its performance. The workpiece, the weaving frequency, and the number of data N are the same as in Evaluation Test 1.

The left end current $I_L$ and the right end current $I_R$ in each cycle of the weaving operation were measured, and the degree of abnormality for each of the left end current and the right end current was calculated using Equations (4) to (9) described above. FIG. 15A is a graph illustrating the left end current $I_L$ measured in this evaluation test, and FIG. 16A is a graph illustrating the right end current $I_R$. In FIGS. 15A and 16A, the horizontal axis indicates the number of weaving operations, and the vertical axis indicates the welding current value. As illustrated in FIG. 15A, when the number of weavings is 1 to 57, the left end current is about 270 A to 280 A, while after the 58th weaving, the left end current decreases to 263 A or less. The standing plate 52 is located on the left side with respect to the welding direction, and the welding point at the left end of the weaving operation is on the standing plate 52. The 58th weaving corresponds to the terminating end of the standing plate 52, and the result of FIG. 15A illustrates that the left end current is decreased due to the absence of the standing plate 52 after the 58th time.

On the other hand, with respect to the right end current, as illustrated in FIG. 16A, a high current value of 281 A to 291 A is maintained over the entire number of weavings. This indicates that the welding point at the right end of the weaving operation is on the lower plate 53, and the absence of the standing plate 52 does not influence the welding state of the lower plate 53.

FIG. 15B is a graph illustrating the degree of abnormality with respect to the left end current calculated in the present evaluation test, and FIG. 16B is a graph illustrating the degree of abnormality with respect to the right end current. In FIGS. 15B and 16B, the horizontal axis indicates the number of weaving operations, and the vertical axis indicates the degree of abnormality. As illustrated in FIG. 15B, at the 1st to 56th times, the degree of abnormality was equal to or less than the reference value, while at the 58th to 63rd times, the degree of abnormality exceeded the reference value. Since the number of weavings at which the degree of abnormality for the left end current exceeded the reference value was the 58th time corresponding to the end point of the standing plate 52, it may be seen that the portion of the standing plate 52 may be accurately detected as a change in the welding state. On the other hand, the degree of abnormality with respect to the right end current is equal to or less than the reference value over the entire number of weavings, as illustrated in FIG. 16B. This accurately reflects the stable transition of the welding state at the right end of the weaving operation. The degree of abnormality is again decreased below the reference value after the 64th time in the degree of abnormality with respect to the left end current, and this is considered to be attributable to the fact that the past values include the data having a high degree of abnormality for welding the portion where the standing plate 52 is not present.

Embodiment 4

In the present embodiment, the welding state determination system acquires the amplitude of the waveform approximated to the periodic temporal change of the welding current value as the characteristic amount for each weaving cycle, calculates the degree of abnormality with respect to this characteristic amount, and determines the welding state based on the degree of abnormality.

<Configuration of Welding System>

The configuration of the welding system according to the present embodiment is the same as the configuration of the welding system 10 according to Embodiment 1, and thus the same components are denoted by the same reference numerals and the description thereof is omitted.

<Operation of Welding System>

Next, an operation of the welding system according to the present embodiment will be described. The operations of the robot controller 30 and the power supply 40 are the same as those described in Embodiment 1, and thus the description thereof is omitted.

The operation of the welding state determination system 100 will be described. FIG. 17 is a flowchart illustrating an operation procedure of the welding state determination system 100 according to the present embodiment. Steps S111 to 112 are the same as those described in Embodiment 1, and thus the description thereof is omitted.

The CPU 111 fits a function that is cyclically repeated at the same cycle as the welding cycle to the waveform of the welding current value, based on the time-series data of the welding current value in the i-th cycle of the welding operation, and calculates the amplitude of the resultant function as the characteristic amount (Step S413). This process will be described in detail. The cyclically changing welding current value may be approximated by the function y(t) of Equation (13) as follows, by assuming that the amplitude is p1 and the phase is $\phi$. Here, t indicates time.

[Formula 5]

$$y(t)=p_1 \times \sin(t+\phi)+p_2 \qquad (13)$$

Equation (13) described above is applied to the weaving operation for i-th cycle, and n equations including the coefficients p1 and p2 are obtained as follows. Here, ti is the time in cycle i.

[Formula 6]

$$\begin{bmatrix} y(t_1) \\ y(t_2) \\ \vdots \\ y(t_n) \end{bmatrix} = \begin{bmatrix} \sin(t_1+\phi) & 1 \\ \sin(t_2+\phi) & 1 \\ \vdots & \vdots \\ \sin(t_n+\phi) & 1 \end{bmatrix} \times \begin{bmatrix} p_1 \\ p_2 \end{bmatrix} \qquad (14)$$

$$(t_1 < t_2 < \ldots < t_n)$$

Assuming that above Equation (14) is B=A×P, p1 and p2 are calculated by Equation (15) as follows.

[Formula 7]

$$P=(A^T \times A)^{-1} \times A^T \times B \qquad (15)$$

The resultant amplitude p1 reflects the maximum value of the welding current for one cycle of the weaving operation.

In this embodiment, a sine wave function of out-of-phase of the welding current value is used in Equation (13), but a function obtained by superimposing a sine wave and a cosine wave illustrated in the following Equation (6) may be used.

[Formula 8]

$$y(t)=q_s \times \sin(t)+q_c \times \cos(t)+p_2 \qquad (16)$$

Each of the amplitude qs of the sine wave and the amplitude qc of the cosine wave in Equation (16) is obtained by the least squares method. Thereafter, using the combination of trigonometric functions, the combined amplitude p1 is determined by following Equation (17).

[Formula 9]

$$p_1=\sqrt{q_s^2+q_c^2} \qquad (17)$$

Steps S114 to S115 are the same as those described in Embodiment 1, and thus the description thereof is omitted.

The CPU 111 calculates a degree of abnormality for the amplitude p1 (step S416). With respect to the amplitude p1 in the i-th cycle of the weaving operation, the average value of the past values is given by Equation (18), the standard deviation is given by Equation (19), and the degree of abnormality is given by Equation (20) as follows.

[Formula 10]

$$\hat{\mu}(p_1(i)) = \frac{1}{N} \sum_{j=i-N}^{i-1} p_1(j) \qquad (18)$$

$$\hat{\sigma}^2(p_1(i)) = \frac{1}{N} \sum_{j=i-N}^{i-1} (p_1(j) - \hat{\mu}(p_1(i)))^2 \qquad (19)$$

$$a(p_1(i)) = \left( \frac{p_1(i) - \hat{\mu}(p_1(i))}{\hat{\sigma}(p_1(i))} \right)^2 \qquad (20)$$

Next, the CPU 111 determines the welding state based on the calculated degree of abnormality with respect to the amplitude p1 (step S417). In this process, the degree of abnormality of the amplitude p1 is compared with a reference value, and when the degree of abnormality exceeds the reference value, it is determined that the welding state is abnormal and it is necessary to stop the welding operation. When the degree of abnormality is equal to or less than the reference value, it is determined that the welding state is normal and it is not necessary to stop the welding operation.

Steps S118 to S119 are the same as those described in Embodiment 1, and thus the description thereof is omitted.

<Evaluation Test 6>

The inventors carried out an evaluation test of the welding state determination method according to the present embodiment as follows and verified its performance. The workpiece, the weaving frequency, and the number of data N are the same as in Evaluation Test 1.

The amplitude p1 in each cycle of the weaving operation was calculated using the above Equations (14) and (15), and the degree of abnormality with respect to the amplitude p1 was calculated using Equations (18) to (20). FIG. 18A is a graph illustrating the amplitude p1 calculated in the present evaluation test. In FIG. 18A, the horizontal axis indicates the number of weaving operations, and the vertical axis indicates the amplitude p1. As illustrated in FIG. 18A, when the number of weavings is 1 to 57, the amplitude p1 is approximately 2 to 7, while after the 58th weaving, the amplitude p1 increases to 8 or higher. As described above, the influence of the absence of the standing plate 52 on the value of the amplitude p1 may be seen after the 58th weaving.

FIG. 18B is a graph illustrating the degree of abnormality with respect to the amplitude p1 calculated in the present evaluation test. In FIG. 18B, the horizontal axis indicates the number of weaving operations, and the vertical axis indicates the degree of abnormality. As illustrated in FIG. 18B, at the 1st to 57th times, the degree of abnormality was equal to or less than the reference value, while at the 58th to 64th times, the degree of abnormality exceeded the reference value. The standing plate 52 terminates after the 58th time, and the degree of abnormality accurately reflects the change in the welding state.

<Evaluation Test 7>

The inventors verified whether burn through may be detected by the welding state determination method according to the present embodiment. The workpiece, the weaving frequency, and the number of data N are the same as in Evaluation Test 3.

FIG. 19A is a graph illustrating the amplitude p1 calculated in the present evaluation test. In FIG. 19A, the horizontal axis indicates the number of weaving operations, and the vertical axis indicates the amplitude p1. As illustrated in FIG. 19A, when the number of weavings is 1 to 18, the amplitude p1 is approximately 2 to 6, while after the 19th weaving, the amplitude p1 increases rapidly due to the influence of burn through.

FIG. 19B is a graph illustrating the degree of abnormality calculated in the present evaluation test. In FIG. 19B, the horizontal axis indicates the number of weaving operations, and the vertical axis indicates the degree of abnormality. As illustrated in FIG. 19B, at the 1st to 17th times, the degree of abnormality was equal to or less than the reference value, while at the 18th to 19th times, the degree of abnormality exceeded the reference value. As described above, it may be seen that burn through may be detected as a change in the welding state by the welding state determination method according to the present embodiment.

Embodiment 5

In the present embodiment, the welding state determination system acquires, for each weaving cycle, three characteristic amounts of an average value of welding current values for each weaving cycle, a welding current value at the oscillation end of weaving, and an amplitude of the welding current value that changes in the same cycle as the weaving cycle, calculates the degree of abnormality for each of these characteristic amounts, and determines the welding state based on the three degrees of abnormality.

<Configuration of Welding System>

The configuration of the welding system according to the present embodiment is the same as the configuration of the welding system 10 according to Embodiment 1, and thus the same components are denoted by the same reference numerals and the description thereof is omitted.

<Operation of Welding System>

Next, an operation of the welding system according to the present embodiment will be described. The operations of the robot controller 30 and the power supply 40 are the same as those described in Embodiment 1, and thus the description thereof is omitted.

The operation of the welding state determination system 100 will be described. FIG. 20 is a flowchart illustrating an operation procedure of welding state determination system 100 according to the present embodiment. Steps S111 and 112 are the same as those described in Embodiment 1, and thus the description thereof is omitted.

The CPU 111 calculates the average current in the i-th cycle as the first characteristic amount (step S5131), and extracts the left end current and the right end current from the measured values as a second characteristic amount (step S5132), and fits a function that is cyclically repeated at the same cycle as the welding cycle to the waveform of the welding current value and calculates the amplitude p1 of the resultant function as a third characteristic amount (Step S5133). The calculation of the average current, the extraction of the left end current and the right end current, and the calculation of the amplitude p1 are the same as those described in Embodiments 1 to 3. Steps S114 and S115 are the same as those described in Embodiment 1, and thus the description thereof is omitted.

The CPU 111 calculates the degree of abnormality with respect to the first characteristic amount as the first degree of abnormality (step S5161), calculates the degree of abnormality with respect to the second characteristic amount as the second degree of abnormality (step S5162), and calculates the degree of abnormality with respect to the third characteristic amount as the third degree of abnormality (step S5163). The calculation of the first to third degrees of abnormality is the same as that described in Embodiments 1 to 3.

Next, the CPU 111 determines the welding state based on each of the first to third degrees of abnormality (step S517). In this process, the CPU 111 compares each of the first to third degrees of abnormality with the reference value, and when two or more degrees of abnormality exceed the reference value, it is determined that the welding state is abnormal and it is necessary to stop the welding operation. When all of the first to third degrees of abnormality are equal to or less than the reference value, it is determined that the welding state is normal and it is not necessary to stop the welding operation.

Steps S118 to S119 are the same as those described in Embodiment 1, and thus the description thereof is omitted.

With the above configuration, the welding state determination system 100 may perform highly reliable abnormality determination by determining that the welding state is abnormal when two or more of the first to third degrees of abnormality exceed the reference value.

Embodiment 6

In the welding state determination method according to the first to fifth embodiments, the degree of abnormality is calculated using the standard deviation. The degree of abnormality assumes that the characteristic amounts exhibit a normal distribution, and an accurate degree of abnormality may not be calculated with respect to a characteristic amount not exhibiting the normal distribution. For example, as illustrated in FIG. 10A, the average current $l_{ave}$ in Evaluation Test 2 illustrates a gradually increasing tendency from the 1st to 72nd weavings. A histogram of the average current with respect to the 1st to 70th weavings in Evaluation Test 2 is illustrated in FIG. 21. In FIG. 21, the vertical axis indicates the number of data (frequency of appearance), and the horizontal axis indicates the average current. In this example, there are two peaks in the number of data at 272 A and 273.5 A, and the normal distribution is not exhibited. The standard deviation in this example is 0.9579. This is due to the tendency of the average current to increase with time.

Therefore, in the present embodiment, the welding state determination system linearly approximates the temporal change of the characteristic amount, calculates the differences between the observation values and the approximation values, and the averages and the standard deviations of the differences between the past values and the approximation values, and calculates the degree of abnormality using the same. As a result, the difference between the characteristic amount and the approximation value is close to a normal distribution, and it is possible to obtain a degree of abnormality that accurately reflects the welding state.

<Configuration of Welding System>

The configuration of the welding system according to the present embodiment is the same as the configuration of the welding system 10 according to Embodiment 1, and thus the same components are denoted by the same reference numerals and the description thereof is omitted.

<Operation of Welding System>Next, an operation of the welding system according to the present embodiment will be described. The operations of the robot controller 30 and the power supply 40 are the same as those described in Embodiment 1, and thus the description thereof is omitted.

The operation of the welding state determination system 100 will be described. FIG. 22 is a flowchart illustrating an operation procedure of the welding state determination system 100 according to the present embodiment. Steps S111 to 115 are the same as those described in Embodiment 1, and thus the description thereof is omitted.

In the welding operation, the observation value may change gradually to approach the target state by feedback control by the robot controller 30. In order to cope with such a gradual change, in the present embodiment, linear approximation of the temporal change of the characteristic amount (average current) is performed.

The CPU 111 linearly approximates the temporal change of the average current for each cycle of the weaving operation (step S6161), and calculates the degree of abnormality based on the approximation value (step S6162). In this process, the degree of abnormality is calculated from the differences between the observation values and the approximation values, and the average and the standard deviation of the differences between the past values and the approximation values. The details will be described below.

The approximation equation Y=at+b is applied to the average current $l_{ave}(i)$ to linearly approximate the temporal change of the average current $l_{ave}(i)$. Here, Y is the average current to be approximated, t is time, and a and b are parameters. The difference between the observation values and the approximation values of the average current is given by Equation (21).

[Formula 11]

$$dl_{ave}^{linerfit}(i) = l_{ave}^{linerfit}(i) - l_{ave}(i) \quad (21)$$

However, $l_{ave}^{linerfit}(i)$ is a linear approximation value of the average current.

The average of the differences between the past values and the approximation values of the average current is given by Equation (22), and its standard deviation is given by Equation (23).

[Formula 12]

$$\hat{\mu}(dl_{ave}^{linearfit}(i)) = \frac{1}{N} \sum_{j=i-N}^{i-1} dl_{ave}^{linearfit}(j) \quad (22)$$

-continued $$\hat{\sigma}^2(dl_{ave}^{linearfit}(i)) = \frac{1}{N} \sum_{j=i-N}^{i-1} (dl_{ave}^{linearfit}(j) - \hat{\mu}(dl_{ave}^{linearfit}(i)))^2 \quad (23)$$

The degree of abnormality using the above is given by Equation (24).

[Formula 13]

$$a(dl_{ave}^{linearfit}(i)) = \left( \frac{dl_{ave}^{linearfit}(i) - \hat{\mu}(dl_{ave}^{linearfit}(i))}{\hat{\sigma}(dl_{ave}^{linearfit}(i))} \right)^2 \quad (24)$$

By doing this, it is possible to obtain a degree of abnormality excluding the influence of gradual temporal change of the characteristic amount by feedback control.

Steps S117 to S119 are the same as those described in Embodiment 1, and thus the description thereof is omitted.

With the above configuration, the degree of abnormality accurately reflecting the welding state may be calculated without being influenced by the gradual temporal change of the characteristic amount due to the feedback control, and the welding state may be determined with high accuracy.

As described above, the computer 101 of the present configuration also serves as an approximation unit that approximates the temporal change of the characteristic amount, and the calculation unit described above serves to calculate the degree of abnormality based on a difference between the observation values and approximation values of the observation values obtained by the approximation unit, and the average and standard deviation of the differences between the past values and the approximation values of the past values obtained by the approximation unit. This is the same in Embodiments 7 and 8 described below.

<Evaluation Test 8>

The inventors carried out an evaluation test of the welding state determination method according to the present embodiment as follows and verified its performance. In this evaluation test, the degree of abnormality was calculated using data of the same average current as Evaluation Test 2.

The temporal change of the average current was linearly approximated. FIG. 23 is a graph illustrating the result of linear approximation. In FIG. 23, the horizontal axis indicates the number of weaving operations, and the vertical axis indicates the average current. As illustrated in FIG. 23, the average current tends to increase with time from the 1st to 70th weavings, and this temporal change may be linearly approximated.

The average and standard deviation of the differences between the approximation values obtained by such linear approximation and the past values were calculated, and the degree of abnormality was calculated from the same. FIG. 24A is a histogram of the difference between the average current and the approximation value. In FIG. 24A, the vertical axis indicates the number of data (occurrence frequency), and the horizontal axis indicates the difference between the average current and the approximation value. The histogram illustrated in FIG. 24A is closer to the normal distribution than the histogram illustrated in FIG. 21. The standard deviation is reduced from 0.9579 to 0.7433, and it may be seen that the irregularity is reduced.

FIG. 24B is a graph illustrating the degree of abnormality calculated in the present evaluation test. In FIG. 24B, the horizontal axis indicates the number of weaving operations, and the vertical axis indicates the degree of abnormality. In the result illustrated in FIG. 24B, the degree of abnormality from the 1st to 72nd weavings is reduced as compared with the degree of abnormality in Evaluation Test 2 in which linear approximation is not performed (see FIG. 10B). In particular, the 56th and 64th degrees of abnormality are small, and more accurately reflect the welding state. The degree of abnormality exceeds the reference value from the 73rd to 76th times, and it may be seen that the change of the welding state may be detected accurately. After the 77th time, the degree of abnormality is lower than the reference value again. This is considered to be attributable to the fact that the data having a high degree of abnormality for welding the portion of the temporary track 54 is included in the past values.

Embodiment 7

As in Embodiment 6, the welding state determination system 100 according to the present embodiment linearly approximates the temporal change of the average current which is the characteristic amount, And as in Embodiment 2, calculates the average and the standard deviation by excluding from the past values the characteristic amounts of which degree of abnormality exceeds a predetermined reference value in the past, and calculates the degree of abnormality using these average and the standard deviation.

<Configuration of Welding System>

The configuration of the welding system according to the present embodiment is the same as the configuration of the welding system 10 according to Embodiment 1, and thus the same components are denoted by the same reference numerals and the description thereof is omitted.

<Operation of Welding System>

Next, an operation of the welding system according to the present embodiment will be described. The operations of the robot controller 30 and the power supply 40 are the same as those described in Embodiment 1, and thus the description thereof is omitted.

The operation of the welding state determination system 100 will be described. FIG. 25 is a flowchart illustrating an operation procedure of welding state determination system 100 according to the present embodiment. Steps S111 to S115 are the same as those described in Embodiment 1, and thus the description thereof is omitted.

The CPU 111 excludes, among the N past values, the past value including the average current of when the degree of abnormality calculated previously exceeds the reference value (step S7161). When the degree of abnormality exceeds the reference value, it may be estimated that the welding state is abnormal. Therefore, by excluding such data with a high degree of abnormality, the past values include only the average current of the time point when the welding state is normal.

Next, the CPU 111 linearly approximates the temporal change of the average current from which data having a high degree of abnormality is excluded (step S7162), and calculates the degree of abnormality based on the approximation value (step S7163). In this process, the degree of abnormality is calculated from the difference between the observation value and the approximation value, and the average and the standard deviation of the differences between the past values and the approximation values. The details will be described below.

It is assumed that there are M abnormal currents exceeding the reference value among the average currents $l_{ave}$ from the (i−N)th to the (i−1)th times. The data of these M average currents are denoted by $l'_{ave}(i, 1)$, $l'_{ave}(i, 2)$, $l'_{ave}(i, 3)$, ..., $l'_{ave}(i, M)$, and a collection of these is denoted by $l'_{ave}(i)$. $l'_{ave}(i)$ is linearly approximated. The difference between the observation value and the approximation value of the average current is given by Equation (25).

[Formula 14]

$$dl_{ave}^{liner}(i) = l'_{ave}{}^{liner}(i) - l_{ave}(i) \quad (25)$$

However, $l'_{ave}{}^{liner}(i)$ is a linear approximation value of the average current.

The average of the differences between the past values and the approximation values of the average current is given by Equation (26), and its standard deviation is given by Equation (27).

[Formula 15]

$$\hat{\mu}(dI'^{linear}_{ave}(i)) = \frac{1}{N}\sum_{j=1}^{n} dI'^{linear}_{ave}(j) \quad (26)$$

$$\sigma^2(dI'^{linear}_{ave}(i)) = \frac{1}{N}\sum_{j=1}^{i-1}(dI'^{linear}_{ave}(j) - \mu(dI'^{linear}_{ave}(i)))^2 \quad (27)$$

The degree of abnormality using the above is given by Equation (28).

[Formula 16]

$$a(I'^{linear}_{ave}(i)) = \left(\frac{dI'^{linear}_{ave}(i) - \hat{\mu}(dI'^{linear}_{ave}(i))}{\hat{\sigma}(dI'^{linear}_{ave}(i))}\right)^2 \quad (28)$$

By doing this, it is possible to obtain a degree of abnormality excluding the influence of gradual temporal change of the characteristic amount by feedback control.

Steps S117 and S118 are the same as those described in Embodiment 1. In the present embodiment, as in Embodiment 2, after the notification of the occurrence of an abnormality, the CPU 111 proceeds the process to step S115 without transmitting a welding stop request. Thus, even when it is determined that the welding state is abnormal, the calculation of the degree of abnormality and determination of the welding state are continuously performed.

With the above configuration, the characteristic amounts of when a welding state is abnormal are excluded from the past values, so that the degree of abnormality is calculated, which accurately reflects the welding state without being affected by abnormal characteristic amounts in the past. By linearly approximating the characteristic amount excluding abnormal data, the difference between the characteristic amount and the approximation value is close to a normal distribution, and it is possible to obtain a degree of abnormality that accurately reflects the welding state.

<Evaluation Test 9>

The inventors carried out an evaluation test of the welding state determination method according to the present embodiment as follows and verified its performance. In this evaluation test, the degree of abnormality was calculated using data of the same average current as Evaluation Test 2.

The average current of when the degree of abnormality exceeds the reference value was excluded from the past value, and the temporal change of the characteristic amount from which abnormal data was excluded was linearly approximated. The average and standard deviation of the differences between the resultant approximation values and the past values were calculated, and the degree of abnormality was calculated from the same. FIG. 26 is a graph illustrating the degree of abnormality calculated in the present evaluation test. In FIG. 26, the horizontal axis indicates the number of weaving operations, and the vertical axis indicates the degree of abnormality. As illustrated in FIG. 26, the degree of abnormality exceeds the reference value after the 73rd number of weavings, and the degree of abnormality accurately reflects the change in the welding state due to the temporary track 54. The degree of abnormality almost exceeded the reference value also after the 64th time while the degree of abnormality did not exceed the reference value after the 64th time in Evaluation Test 7. Thus, it may be seen that changes in the welding state may be accurately detected without being influenced by data having a high degree of abnormality.

Embodiment 8

In Embodiment 6 described above, the configuration has been described in which the temporal change of the characteristic amount is linearly approximated. However, in the feedback control by the robot controller 30, when the difference between the target value and the current observation value is large as in the case of immediately after the arc start, the observation value changes rapidly. The temporal change at this time is not linear, and may not be accurately approximated by linear approximation.

Therefore, in the present embodiment, when the characteristic amount does not change linearly, the welding state determination system performs a quadratic approximation with respect to the temporal change, calculates the difference between the observation value and the approximation value, the average and the standard deviation of the differences between the past values and the approximation values, and calculates the degree of abnormality using the same.

<Configuration of Welding System>

The configuration of the welding system according to the present embodiment is the same as the configuration of the welding system 10 according to Embodiment 1, and thus the same components are denoted by the same reference numerals and the description thereof is omitted.

<Operation of Welding System>

Next, an operation of the welding system according to the present embodiment will be described. The operations of the robot controller 30 and the power supply 40 are the same as those described in Embodiment 1, and thus the description thereof is omitted.

The operation of the welding state determination system 100 will be described. FIG. 27 is a flowchart illustrating an operation procedure of welding state determination system 100 according to the present embodiment. Steps S111 to 115 are the same as those described in Embodiment 1, and thus the description thereof is omitted.

The CPU 111 performs a quadratic approximation with respect to the temporal change of the average current for each cycle of the weaving operation (step S8161), and calculates the degree of abnormality based on the approximation value (step S8162). In this process, the degree of abnormality is calculated from the difference between the observation value and the approximation value, and the average and the standard deviation of the differences between the past values and the approximation values. The details will be described below.

The approximation equation Y=a(t0−t)2+b is applied to the average current $l_{ave}(i)$ to perform a quadratic approximation with respect to the temporal change of the average current $l_{ave}(i)$. Here, Y is the average current to be approximated, t0 is a determination time, t is time, and a and b are parameters. The difference between the observation value and the approximation value of the average current is given by Equation (29).

[Formula 17]

$$dI_{ave}^{curvefit}(t) = l_{ave}^{curvefit}(t) - l_{ave}(t) \tag{29}$$

However, $l_{ave}^{curvefit}(i)$ is a quadratic approximation value of the average current.

The average of the differences between the past values and the approximation values of the average current is given by Equation (30), and its standard deviation is given by Equation (31).

[Formula 18]

$$\hat{\mu}(dI_{ave}^{curvefit}(i)) = \frac{1}{N} \sum_{x=t-N}^{t-1} dI_{ave}^{curvefit}(x) \tag{30}$$

$$\hat{\sigma}^2(dI_{ave}^{curvefit}) = \frac{1}{N} \sum_{x=t-N}^{t-1} (dI_{ave}^{curvefit}(x) - \hat{\mu}(dI_{ave}^{curvefit}))^2 \tag{31}$$

The degree of abnormality using the above is given by Equation (32).

[Formula 19]

$$a(dI_{ave}^{curvefit}(t)) = \left(\frac{dI_{ave}^{curvefit}(t) - \hat{\mu}(dI_{ave}^{curvefit})}{\hat{\sigma}}\right)^2 \tag{32}$$

By doing this, it is possible to obtain a degree of abnormality excluding the influence of quadratic functional temporal change of the characteristic amount by the feedback control.

Steps S118 and S119 are the same as those described in Embodiment 1, and thus the description thereof is omitted.

With the above configuration, the degree of abnormality accurately reflecting the welding state may be calculated without being influenced by non-linear temporal change of the characteristic amount due to the feedback control, and the welding state may be determined with high accuracy.

<Evaluation Test 10>

The inventors carried out an evaluation test of the welding state determination method according to the present embodiment as follows and verified its performance. In this evaluation test, the welding was performed on a workpiece to which a temporary track was applied at a position close to the arc start point, and it was verified whether the temporary track could be detected as a change in the welding state. In this evaluation test, the weaving frequency and the number of data N were set to 2 Hz and 50, respectively, as in Evaluation Test 2. In carrying out this test, the other conditions were the same as in Evaluation Test 1.

FIG. 28 illustrates a graph of the temporal change of the average current immediately after the arc start. In FIG. 28, the vertical axis indicates the average current, and the horizontal axis indicates the number of weavings. In this example, the average current sharply decreases from the 1st to 30th weavings, and this temporal change is nonlinear. The temporary track is located in the vicinity of the 36th time, and the rising of the average current in this part represents the influence of the temporary track.

In this evaluation test, the temporal change of the average current is subjected to a quadratic approximation. FIG. 29A is a graph illustrating the result of quadratic approximation. In FIG. 29A, the horizontal axis indicates the number of weaving operations, and the vertical axis indicates the average current. The temporal change of the average current subjected to quadratic approximation is indicated by a solid line.

The average and standard deviation of the differences between the approximation values obtained by such quadratic approximation and the past values were calculated, and the degree of abnormality was calculated from the same. FIG. 29B is a graph illustrating the degree of abnormality calculated in the present evaluation test. In FIG. 29B, the horizontal axis indicates the number of weaving operations, and the vertical axis indicates the degree of abnormality. In the result illustrated in FIG. 29B, the degree of abnormality exceeded the reference at the 36th time. As described above, according to the method, it was possible to detect the temporary track as a change in the welding state during the arc transitioning to stable state from the arc start.

Other Embodiments

In Embodiments 1 to 8 described above, the configuration is described, in which the welding operation is stopped when it is determined that the welding state is abnormal, but embodiments are not limited thereto. It may be configured such that the welding control is changed when it is determined that welding state is abnormal. FIG. 30 is an explanatory view for explaining a welding with a tracking control on a workpiece to which the temporary track is performed. In the case as illustrated in FIG. 30, the welding progresses along the straight line of the intersection of the two members which is the welding seam by the tracking control. When the arc reaches the temporary track 54 provided in the middle of this intersection, in the tracking control, the boundary of temporary track 54 is erroneously detected as the welding seam, and the welding is progressed along this boundary as illustrated by the arrow in the drawing. In order to prevent such a welding defect, when the temporary track is detected as an abnormality of the welding state, it is also possible to stop the tracking control while continuing the control of the feedback control and the weaving operation.

In Embodiment 8 mentioned above, a configuration is described, in which the quadratic approximation is performed with respect to the same temporal change, but embodiments are not limited thereto. It may be configured such that the temporal change of the characteristic amount is exponentially approximated instead of the quadratically approximated.

In Embodiment 6 described above, a configuration is described, in which the temporal change of the characteristic amount is linearly approximated, and in Embodiment 8, a configuration is described, in which the same temporal change is subjected to quadratic approximation. It may be configured to perform both the linear approximation and the quadratic approximation. In this case, since the characteristic amount changes rapidly with time immediately after the arc start until the arc welding transitions from the unstable state to the stable state, the quadratic approximation may be performed, and a linear approximation may be performed in a stable state in which the temporal change is gradual.

In Embodiments 1 to 8 described above, the configuration using the welding current value as the physical quantity has been described, but not limited thereto. Any physical amount may be used instead of the welding current value as long as it is changed according to the cycle of the weaving operation. In a welding method using a constant current source such as tungsten inert gas (TIG) welding, the welding voltage value changes according to the cycle of the weaving operation. Therefore, a welding voltage value may be used as the physical quantity. Although the configuration in which the average current, the left end current and the right end current, and the amplitude of the welding current value are used as characteristic amounts has been described, embodiments are not limited thereto. The average value of the welding current values in the weaving cycle, the welding current value at the oscillation end of the welding torch in the weaving operation, and the amplitude of the welding current value changing in the same cycle as the weaving cycle may be used as the characteristic amount. The physical quantity at the center of oscillation of the welding torch in the weaving operation, or the integral value of the physical quantity in a certain section including the oscillation end may be used as the characteristic amount. The integral value will be described. FIGS. 31A and 31B are graphs for explaining the integral value of the welding current in a certain section including the oscillation end. In FIGS. 31A and 31B, the horizontal axis indicates time, and the vertical axis indicates the welding current value. In the drawing, the peak denoted as "R" corresponds to the right end, and the peak denoted as "L" corresponds to the left end. In FIG. 31A, the valley portion of the waveform corresponds to the center of oscillation in the weaving operation. Accordingly, a section between two adjacent valleys including the peak of "R" is a section from the center of oscillation of the weaving operation to return to the center of oscillation through the right end (hereinafter referred to as "right side section"), and a section between two adjacent valleys including the peak of "L" is a section from the center of oscillation to return to the center of oscillation through the left end (hereinafter referred to as "left side section"). The integral values SR and SL (shaded portions) of the welding current in the right section or the left section change according to the weaving cycle, and thus are values reflecting the welding state and may be used as the characteristic amount. The start point and the end point of the section may not be at the center of oscillation. For example, as illustrated in FIG. 31B, a reference value of the welding current value may be determined, and an integral value of a section in which the welding current value is equal to or greater than the reference value may be used as the characteristic amount.

In Embodiment 5 described above, the configuration has been described, in which three characteristic amounts of an average value of welding current values in each cycle of weaving, a welding current value at the oscillation end of weaving, and an amplitude of the welding current value that changes in the same cycle as the weaving cycle are acquired for each weaving cycle, the degree of abnormality for each of these characteristic amounts is calculated, and the welding state based on the three degrees of abnormality is determined, but is not limited thereto. It may be configured such that at least two or more of an average value of the physical quantities in the weaving cycle, a physical quantity at the oscillation end of the welding torch in the weaving operation, a physical quantity at the center of oscillation of welding torch in weaving operation, an integral value of physical quantity in the section including the oscillation end, or an amplitude of physical quantity that changes in the same cycle as the weaving cycle are acquired as a characteristic amount, and thus the degree of abnormality is calculated for each of these characteristic amounts, and the welding state is determined based on a plurality of degrees of abnormality.

In Embodiments 1 to 8 described above, the configuration in which all the processes of the welding state determination program 150 are executed by the single computer 101 has been described, but is not limited thereto, and it is also possible to use a distributed system in which processes similar to those of the welding state determination program 150 is distributed and executed by a plurality of devices (computers). In Embodiments 1 to 8, the configuration of separately providing the welding state determination system 100 and the robot control device 30 has been described, but is not limited thereto. The welding state determination system 100 may have a function as a robot controller 30, that is, a function of executing control of weaving operation, tracking control, and feedback control of welding operation, and a function of controlling power supply 40.

INDUSTRIAL APPLICABILITY

The welding state determination system and the welding state determination method according to the present disclosure are useful as a welding state determination system and a welding state determination method for determining the welding state in an arc welding.

This application is based on a Japanese patent application (Japanese Patent Application No. 2017-47262) filed on Mar. 13, 2017, the contents of which are incorporated herein by reference.

DESCRIPTION OF REFERENCE NUMERALS AND SIGNS

10: welding system
20: welding robot
21: welding torch
23: wire feeder
24: welding wire
30: robot controller
301: CPU
330: control program
40: power supply
41: constant voltage power supply
42: welding current detector
43: switch
50: workpiece
100: welding state determination system
111: CPU
114: hard disk
130: display unit
150: welding state determination program

The invention claimed is:

1. A welding state determination system that determines a welding state in arc welding by a weaving operation in which a welding torch is oscillated in cycles, the welding state determination system comprising:
a processor configured to:
acquire, for each cycle, a characteristic amount that pertains to a physical quantity that changes according to the cycle of the weaving operation;
calculate a degree of abnormality based on an observation value that is the characteristic amount acquired in one cycle by the processor and an average and standard deviation of a plurality of past values that are the characteristic amounts acquired prior to the one cycle by the processor; and
determine the welding state based on the degree of abnormality calculated by the processor,
wherein the processor is configured to:
approximate temporal change of the characteristic amount; and
calculate the degree of abnormality based on a difference between the observation value and approximation value of the observation value obtained by the processor, and the average and the standard deviation of the differences between the past values and the approximation values of the past values obtained by the processor.

2. The welding state determination system according to claim 1, wherein the processor is configured to:
calculate the degree of abnormality for each cycle; and
exclude the characteristic amounts used as the observation value in the calculation of the degree of abnormality in the previous cycles from the plurality of past values when the degree of abnormality calculated in cycles previous to the one cycle is greater than a predetermined reference value.

3. The welding state determination system according to claim 1, wherein the processor is configured to:
approximate the temporal change of the characteristic amount by linear approximation.

4. The welding state determination system according to claim 1, wherein the processor is configured to:
approximate the temporal change of the characteristic amount by quadratic approximation or exponential approximation.

5. The welding state determination system according to claim 1, wherein
the characteristic amount is an average value of the physical quantity in the cycle, the physical quantity at an oscillation end of the welding torch in the weaving operation, the physical quantity at a center of oscillation of the welding torch in the weaving operation, an integral value of the physical quantity in a section including the oscillation end, or an amplitude of a waveform approximate a cyclical temporal change of the physical quantity.

6. The welding state determination system according to claim 1, wherein the processor is configured to:
acquire, as the characteristic amount, at least two or more of an average value of the physical quantity in the cycle, the physical quantity at an oscillation end of the welding torch in the weaving operation, the physical quantity at a center of oscillation of the welding torch in the weaving operation, an integral value of the physical quantity in a section including the oscillation end, or an amplitude of a waveform approximate a cyclical temporal change of the physical quantity;
calculate the degree of abnormality separately for each of the characteristic amounts; and
determine the welding state based on each degree of abnormality calculated by the processor.

7. The welding state determination system according to claim 1, further comprising:
a controller configured to control an operation of the arc welding based on the determination result of the welding state by the processor.

8. The welding state determination system according to claim 1, wherein the processor is configured to:
notify the abnormality when the processor determines that the welding state is abnormal.

9. The welding state determination system according to claim 1, wherein
the physical quantity is a welding current or a welding voltage.

10. The welding state determination system according to claim 2, wherein the processor is configured to:
- approximate temporal change of the characteristic amount; and
- calculate the degree of abnormality based on a difference between the observation value and approximation value of the observation value obtained by the processor, and the average and the standard deviation of the differences between the past values and the approximation values of the past values obtained by the processor.

11. The welding state determination system according to claim 2, wherein
- the characteristic amount is an average value of the physical quantity in the cycle, the physical quantity at an oscillation end of the welding torch in the weaving operation, the physical quantity at a center of oscillation of the welding torch in the weaving operation, an integral value of the physical quantity in a section including the oscillation end, or an amplitude of a waveform approximate a cyclical temporal change of the physical quantity.

12. The welding state determination system according to claim 2, wherein the processor is configured to:
- acquire, as the characteristic amount, at least two or more of an average value of the physical quantity in the cycle, the physical quantity at an oscillation end of the welding torch in the weaving operation, the physical quantity at a center of oscillation of the welding torch in the weaving operation, an integral value of the physical quantity in a section including the oscillation end, or an amplitude of a waveform approximate a cyclical temporal change of the physical quantity;
- calculate the degree of abnormality separately for each of the characteristic amounts; and
- determine the welding state based on each degree of abnormality calculated by processor.

13. The welding state determination system according to claim 2, further comprising:
- a controller configured to control an operation of the arc welding based on the determination result of the welding state by processor.

14. The welding state determination system according to claim 2, wherein the processor is configured to:
- notify the abnormality when the processor determines that the welding state is abnormal.

15. The welding state determination system according to claim 2, wherein
- the physical quantity is a welding current or a welding voltage.

* * * * *